US012777450B2

(12) United States Patent
Hirzallah et al.

(10) Patent No.: US 12,777,450 B2
(45) Date of Patent: Oct. 27, 2026

(54) RESOURCE CONFIGURATIONS FOR MACHINE LEARNING (ML) POSITIONING MODEL MONITORING AND LIFE CYCLE MANAGEMENT

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 18/458,488

(22) Filed: Aug. 30, 2023

(65) Prior Publication Data

US 2025/0081145 A1 Mar. 6, 2025

(51) Int. Cl.
*H04W 64/00* (2009.01)
*G01S 5/00* (2006.01)
(Continued)

(52) U.S. Cl.
CPC ........... *H04W 64/00* (2013.01); *G01S 5/0018* (2013.01); *G01S 5/0244* (2020.05); *G01S 5/0268* (2013.01);
(Continued)

(58) Field of Classification Search
CPC .... H04W 64/00; H04W 24/08; H04L 5/0035; H04L 41/16; G01S 5/0018; G01S 5/0268; G01S 5/0244; G01S 1/0428; G01S 5/0278
See application file for complete search history.

(56) References Cited

U.S. PATENT DOCUMENTS 11,032,665 B1 6/2021 George et al.
12,526,765 B2 * 1/2026 Ashraf .................. H04W 64/00
2024/0295625 A1 * 9/2024 Hasegawa ............. G01S 5/0263

FOREIGN PATENT DOCUMENTS

WO WO-2022155244 A2 * 7/2022 ........... G01S 5/0268

OTHER PUBLICATIONS

International Search Report and Written Opinion—PCT/US2024/043378—ISA/EPO—Dec. 3, 2024.

(Continued)

*Primary Examiner* — Angela Widhalm De Rodriguez
(74) *Attorney, Agent, or Firm* — NORTON ROSE FULBRIGHT US LLP

(57) ABSTRACT

This disclosure provides systems, methods, and devices for wireless communication that support machine learning (ML) positioning model monitoring and life cycle management. In some aspects, a user equipment (UE) may receive, from a network entity, a configuration message associated with a first set of reference signals and a second set of reference signals. The UE may perform first measurements based on the first set of reference signals received from a first set of transmit/receive points (TRPs) to generate first measurement data. The UE may perform second measurements based on the second set of reference signals received from a second set of TRPs to generate second measurement data. The UE may transmit, to the network entity, a reporting message based on the second measurements or based on the first measurement data and the second measurement data. Other aspects and features are also claimed and described.

30 Claims, 9 Drawing Sheets

(51) Int. Cl.
*G01S 5/02* (2010.01)
*H04L 5/00* (2006.01)
*H04L 41/16* (2022.01)
*H04W 24/08* (2009.01)
*G01S 1/04* (2006.01)

(52) U.S. Cl.
CPC ............ *H04L 5/0035* (2013.01); *H04L 41/16* (2013.01); *H04W 24/08* (2013.01); *G01S 1/0428* (2019.08); *G01S 5/0278* (2013.01)

(56) References Cited

OTHER PUBLICATIONS

Qualcomm Incorporated: "Other Aspects on Al—ML for Positioning Accuracy Enhancement", 3GPP TSG RAN WG1 #109-e, R1-2205029, 3rd Generation Partnership Project, Mobile Competence Centre, 650, Route Des Lucioles, F-06921 Sophia-Antipolis Cedex, France, vol. Ran WG1, No. e-Meeting, May 9, 2022-May 20, 2022, 16 Pages, Apr. 29, 2022, XP052144138, sections: 6.1 Training data assistance, 6.4 Performance monitoring, 8.2 Robustness to environment conditions.

* cited by examiner

RESOURCE CONFIGURATIONS FOR MACHINE LEARNING (ML) POSITIONING MODEL MONITORING AND LIFE CYCLE MANAGEMENT

TECHNICAL FIELD

Aspects of the present disclosure relate generally to wireless communication systems, and more particularly, to resource configurations for machine learning (ML) positioning model monitoring and life cycle management in a wireless network. Some features may enable and provide improved communications, including ML-based positioning communications having improved accuracy without substantially increasing communication overhead in the wireless network.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Wireless communication devices may perform a variety of positioning techniques to determine respective locations. Some such positioning techniques include timing-based positioning and angle-based positioning that often involve a communication exchange between a wireless communication device that is determining a respective location and a device that currently possesses location information. A user equipment (UE) that performs a positioning operation typically exchanges communications with another device to perform such positioning operations. As artificial intelligence (AI) and machine learning (ML) technology has advanced, AI and ML models have become increasingly sophisticated and are able to be used in a wide variety of applications. One such application is device positioning for wireless communication systems. As an example, an ML positioning model may be trained using training data based on positioning data from UEs at particular locations. Such training enables the ML positioning model to learn site specific features and thereby output a predicted location of a UE based on input measurements. However, because of the ML model learns site specific features, the ML model can be sensitive to changes in environment and UE mobility, such as the UE moving to a new environment. As such, AI and ML positioning models may require frequent monitoring to ensure that the predicted locations are sufficiently accurate. One issue with such monitoring is the establishment of a "ground truth" for computing monitoring metrics. A ground truth (e.g., a more accurate or verified measurement) can be obtained from more accurate positioning techniques than the device-to-device positioning performed by many UEs, such as techniques that leverage global positioning satellite (GPS) signals, global navigation satellite system (GNSS) signals, or light detection and ranging (Lidar). However, such techniques are typically power and resource intensive, and thus may not be supported by many types of UEs. As such, establishing an accurate ground truth measurement for monitoring AI and ML positioning models can be challenging.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes receiving, from a network entity, a configuration message associated with a first set of reference signals and a second set of reference signals. The method also includes performing first measurements based on the first set of reference signals received from a first set of transmit/receive points (TRPs) to generate first measurement data. The method includes performing second measurements based on the second set of reference signals received from a second set of TRPs to generate second measurement data. The method further includes transmitting, to the network entity, a reporting message based on the second measurements or based on the first measurement data and the second measurement data.

In an additional aspect of the disclosure, a UE is configured for wireless communication. The UE includes a memory and at least one processor coupled to the memory. The memory stores processor-readable code. The at least one processor is configured to execute the processor-readable code to cause the at least one processor to receive, from a network entity, a configuration message associated with a first set of reference signals and a second set of reference signals. The at least one processor is also configured to perform first measurements based on the first set of reference signals received from a first set of TRPs to generate first measurement data. The at least one processor is configured to perform second measurements based on the second set of reference signals received from a second set of TRPs to generate second measurement data. The at least one processor is further configured to transmit, to the network entity, a reporting message based on the second measurement data or based on the first measurement data and the second measurement data.

In an additional aspect of the disclosure, an apparatus for wireless communication includes means for means for receiving, from a network entity, a configuration message associated with a first set of reference signals and a second set of reference signals. The apparatus also includes means for performing first measurements based on the first set of reference signals received from a first set of TRPs to generate first measurement data. The apparatus includes means for performing second measurements based on the second set of reference signals received from a second set of TRPs to generate second measurement data. The apparatus further includes means for transmitting, to the network entity, a reporting message based on the second measurements or based on the first measurement data and the second measurement data.

In an additional aspect of the disclosure, a non-transitory, computer-readable medium stores instructions that, when executed by a processor of a UE, cause the processor to perform operations. The operations include receiving, from a network entity, a configuration message associated with a first set of reference signals and a second set of reference signals. The operations also include performing first measurements based on the first set of reference signals received from a first set of TRPs to generate first measurement data. The operations include performing second measurements based on the second set of reference signals received from a second set of TRPs to generate second measurement data. The operations further include transmitting, to the network entity, a reporting message based on the second measurements or based on the first measurement data and the second measurement data.

In an additional aspect of the disclosure, an apparatus includes a communication interface configured to receive, from a network entity, a configuration message associated with a first set of reference signals and a second set of reference signals. The apparatus further includes at least one processor coupled to a memory storing processor-readable code. The at least one processor is configured to execute the processor-readable code to cause the at least one processor to perform first measurements based on the first set of reference signals received from a first set of TRPs to generate first measurement data. The at least on processor is also configured to perform second measurements based on the second set of reference signals received from a second set of TRPs to generate second measurement data. The communication interface is further configured to transmit, to the network entity, a reporting message based on the second measurements or based on the first measurement data and the second measurement data.

In an additional aspect of the disclosure, a method for wireless communication is performed by a network entity. The method includes transmitting, to a UE, a configuration message associated with a first set of reference signals and a second set of reference signals. The first set of reference signals is transmitted by a first set of TRPs and the second set of reference signals is transmitted by a second set of TRPs. The method also includes receiving, from the UE, one or more positioning messages that include first measurement data associated with the first set of reference signals. The method further includes receiving, from the UE, a reporting message based on second measurement data associated with the second set of reference signals or based on the first measurement data and the second measurement data.

In an additional aspect of the disclosure, a network entity is configured for wireless communication. The network entity includes a memory and at least one processor coupled to the memory. The memory stores processor-readable code. The at least one processor is configured to execute the processor-readable code to cause the at least one processor to transmit, to a UE, a configuration message associated with a first set of reference signals and a second set of reference signals. The first set of reference signals is transmitted by a first set of TRPs and the second set of reference signals is transmitted by a second set of TRPs. The at least one processor is also configured to receive, from the UE, one or more positioning messages that include first measurement data associated with the first set of reference signals. The at least one processor is further configured to receive, from the UE, a reporting message based on second measurement data associated with the second set of reference signals or based on the first measurement data and the second measurement data.

In an additional aspect of the disclosure, an apparatus for wireless communication includes means for means for transmitting, to a UE, a configuration message associated with a first set of reference signals and a second set of reference signals. The first set of reference signals is transmitted by a first set of TRPs and the second set of reference signals is transmitted by a second set of TRPs. The apparatus also includes means for receiving, from the UE, one or more positioning messages that include first measurement data associated with the first set of reference signals. The apparatus further includes means for receiving, from the UE, a reporting message based on second measurement data associated with the second set of reference signals or based on the first measurement data and the second measurement data.

In an additional aspect of the disclosure, a non-transitory, computer-readable medium stores instructions that, when executed by a processor of a network entity, cause the processor to perform operations. The operations include transmitting, to a UE, a configuration message associated with a first set of reference signals and a second set of reference signals. The first set of reference signals is transmitted by a first set of TRPs and the second set of reference signals is transmitted by a second set of TRPs. The operations also include receiving, from the UE, one or more positioning messages that include first measurement data associated with the first set of reference signals. The operations further include receiving, from the UE, a reporting message based on second measurement data associated with the second set of reference signals or based on the first measurement data and the second measurement data.

In an additional aspect of the disclosure, an apparatus includes at least one processor coupled to a memory storing processor-readable code. The at least one processor is configured to execute the processor-readable code to cause the at least one processor to generate a configuration message associated with a first set of reference signals and a second set of reference signals. The first set of reference signals is transmitted by a first set of TRPs and the second set of reference signals is transmitted by a second set of TRPs. The apparatus further includes a communication interface configured to transmit, to a UE, the configuration message. The communication interface is also configured to receive, from the UE, one or more positioning messages that include first measurement data associated with the first set of reference signals. The communication interface is further configured to receive, from the UE, a reporting message based on second measurement data associated with the second set of reference signals or based on the first measurement data and the second measurement data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
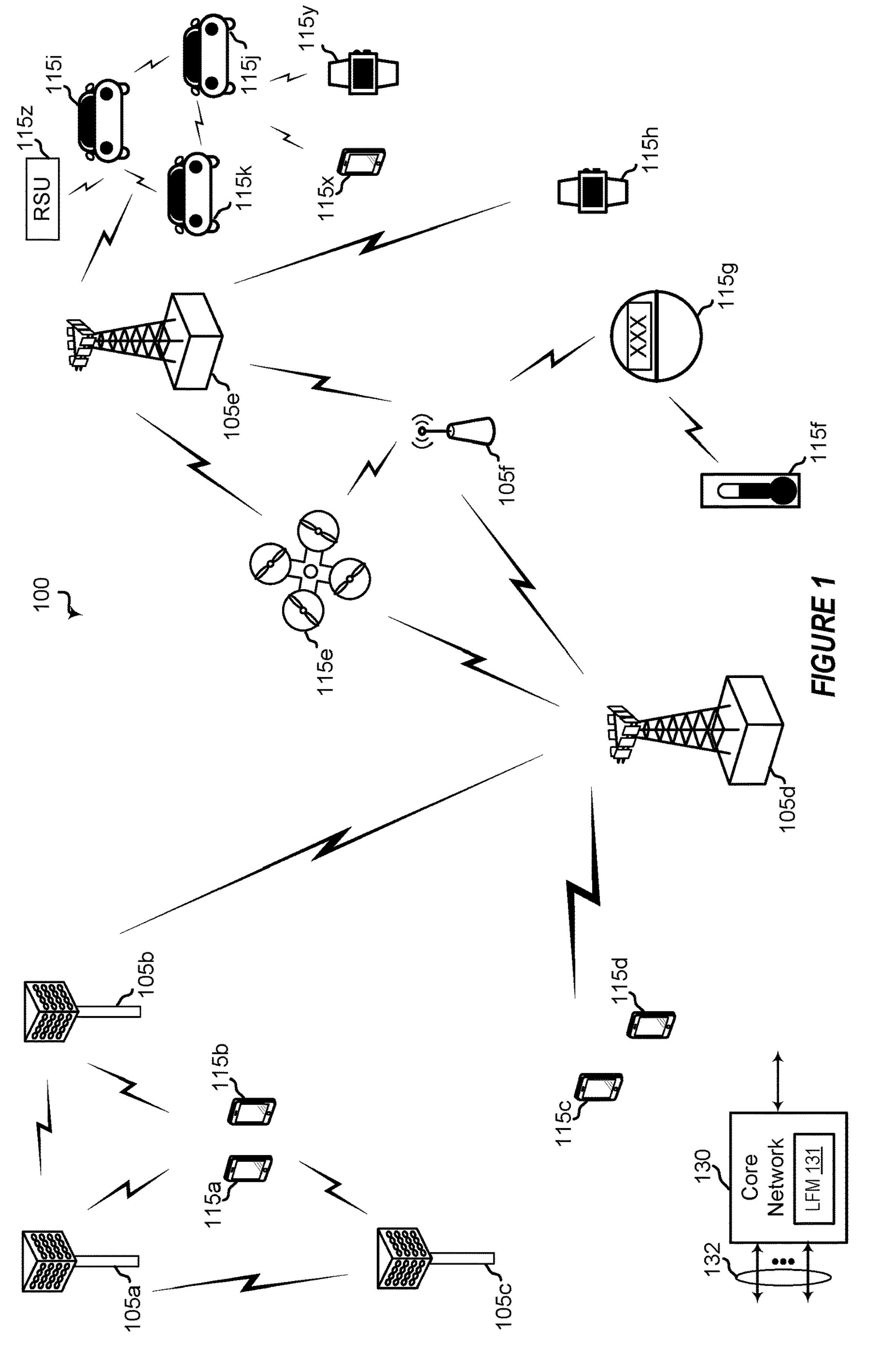
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

Various aspects relate generally to machine learning (ML) and artificial intelligence (AI) positioning model monitoring and life cycle management in a wireless network. Some aspects more specifically relate to positioning and monitoring configurations, with respect to different reference signals, that enable a user equipment (UE) to perform positioning measurements and perform additional measurements (e.g., monitoring measurement), for use in monitoring a trained ML positioning model. In some examples, a network entity, such as a base station, may transmit configuration messages to a UE and to multiple sets of transmit/receive points (TRPs) to configure the transmission of multiple sets of reference signals by the multiple sets of TRPs for monitoring and measurement by the UE. For example, the UE may measure a first set of reference signals that are transmitted by a first set of TRPs to generate first measurement data that can be used for positioning, and the UE may measure a second set of reference signals that are transmitted by a second set of TRPs to generate second measurement data that can be used for monitoring. The second set of reference signals, or wireless communication resources associated therewith, may be configured such that the second set of reference signals have higher resolution than the first set of reference signals, and thereby provide more accurate location information that can be used to monitor the accuracy of location information that is generated based on the first set of reference signals and using a ML positioning model. In some implementations, the ML positioning model may be implemented at the UE, and the UE may determine a metric based on a comparison between location information output by the ML positioning model (e.g., using measurements of the first set of reference signals as input) and location information derived from measurements of the second set of reference signals, such as by using a different, more accurate ML model or a different positioning technique. In some other implementations, the ML positioning model is implemented at the wireless network, such as a server that hosts a location management function (LMF), and the UE provides the various measurement data to the server for determination of the metric. In either implementation, the metric may be used to determine a life cycle management operation to be performed with respect to the ML positioning model, such as continuing to use the ML positioning model, switching to a different ML positioning model or positioning technique, or deactivating the ML positioning technique.

Particular aspects of the subject matter described in this disclosure can be implemented to realize one or more of the following potential advantages. In some aspects, by configuring reference signals with higher resolution for use in the performance of monitoring operations, aspects of the present disclosure may enable and provide improved communications, including ML-based positioning communications having improved accuracy without substantially increasing communication overhead in the wireless network. For example, location information that is generated based on the monitoring reference signals, which has higher accuracy due to the higher resolution of the reference signals, may be used to monitor the output of the ML positioning model to determine if the ML positioning model is performing within a target tolerance. If the accuracy of the ML positioning model is not within the target tolerance, such as due to the UE moving to an environment for which the ML positioning model has not been sufficiently trained, the UE positioning may be switched to a different ML positioning model or positioning technique that is not as sensitive to changes in the environment. In this manner, accurate positioning can be performed using ML positioning models in some situations in which the outputs are within a target tolerance, and the ML positioning model may be supplemented with other positioning information in situations in which the ML positioning model does not perform as well.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations **105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f*** is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD communications or low-latency FDD communications, such as in a vehicle-to-vehicle (V2V) mesh network between UEs 115*i*-115*k* communicating with macro base station 105*e*. Additionally, V2V mesh network may include or correspond to a vehicle-to-everything (V2X) network between UEs 115*i*-115*k* and one or more other devices, such as UEs 115*x*, 115*y*, or UE 115*z* (e.g., a roadside unit (RSU)).

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a management function, such as a Location Management Function (LMF) 131, a Sensing Management function (SnMF), or an Access and Mobility Management Function (AMF), which is an entity in the 5G Core Network (5GC) supporting various functionality, such as managing support for different location services for one or more UEs. The SnMF may be configured to manage support for one or more sensing operations or sensing services for one or more devices, such as one or more UEs 115, one or more base stations 105, one or more TRPs, or a combination thereof. For example the SnMF may include one or more servers, such as multiple distributed servers. Base stations 105 may forward sensing messages to the SnMF and may communicate with the SnMF via a NR Positioning Protocol A (NRPPa). The SnMF is configured to control sensing parameters for UEs 115 and the SnMF can provide information to the base stations 105 and UE 115 so that action can be taken at UE 115, base station 105, or another device. LMF 131 may include one or more servers, such as multiple distributed servers. Base stations 105 may forward location messages to LMF 131 and may communicate with LMF 131 via a NR Positioning Protocol A (NRPPa). LMF 131 is configured to control the positioning parameters for UEs 115 and LMF 131 can provide information to base station 105 and UE 115 so that action can be taken at UE 115. In some implementations, UE 115 and base station 105 are configured to communicate with LMF 131 via the AMF.

Figure 2:
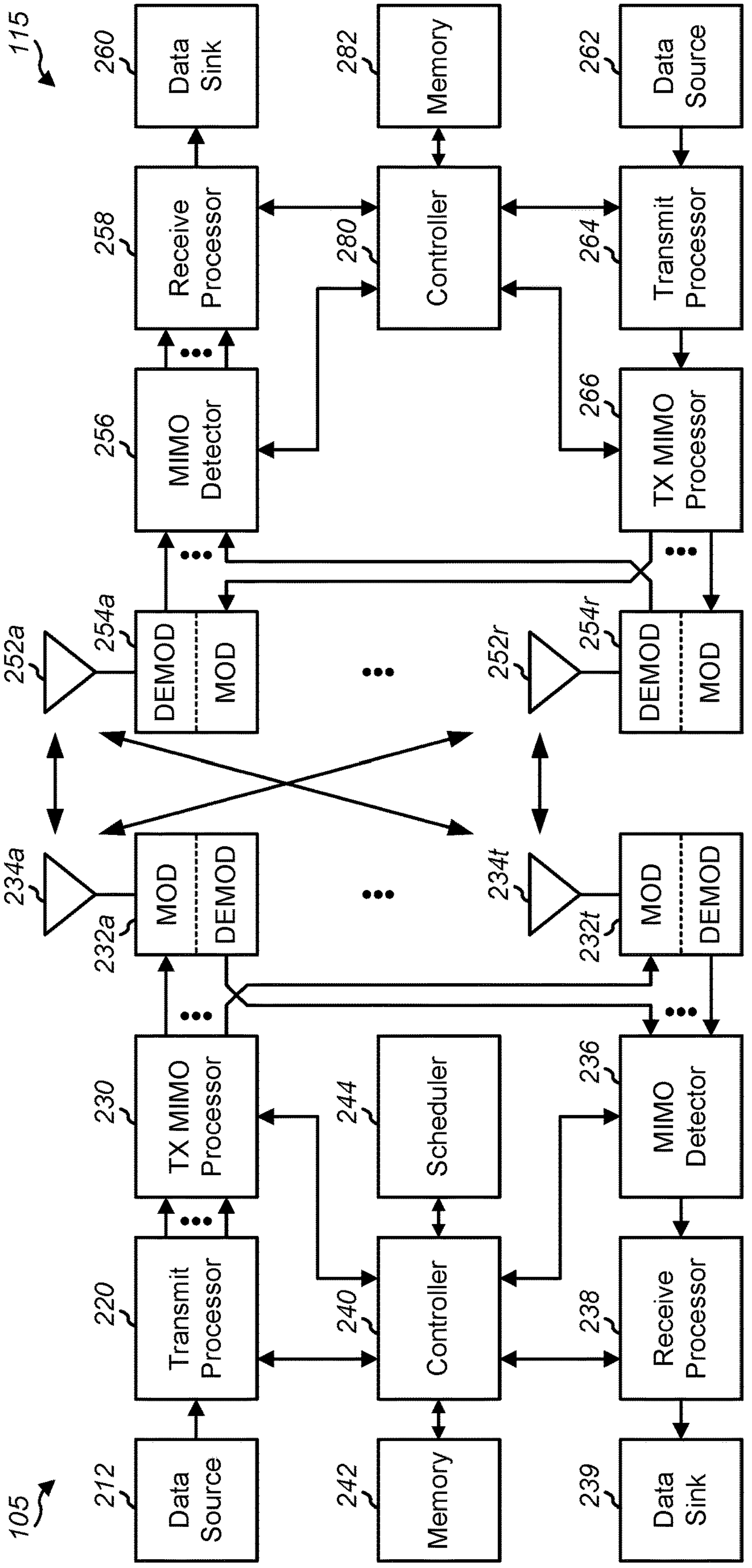
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232*a* through 232*t*. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via antennas 234*a* through 234*t*, respectively.

At UE 115, antennas 252*a* through 252*r* may receive the downlink signals from base station 105 and may provide received signals to demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254*a* through 254*r* (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIGS. 7 and 9, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
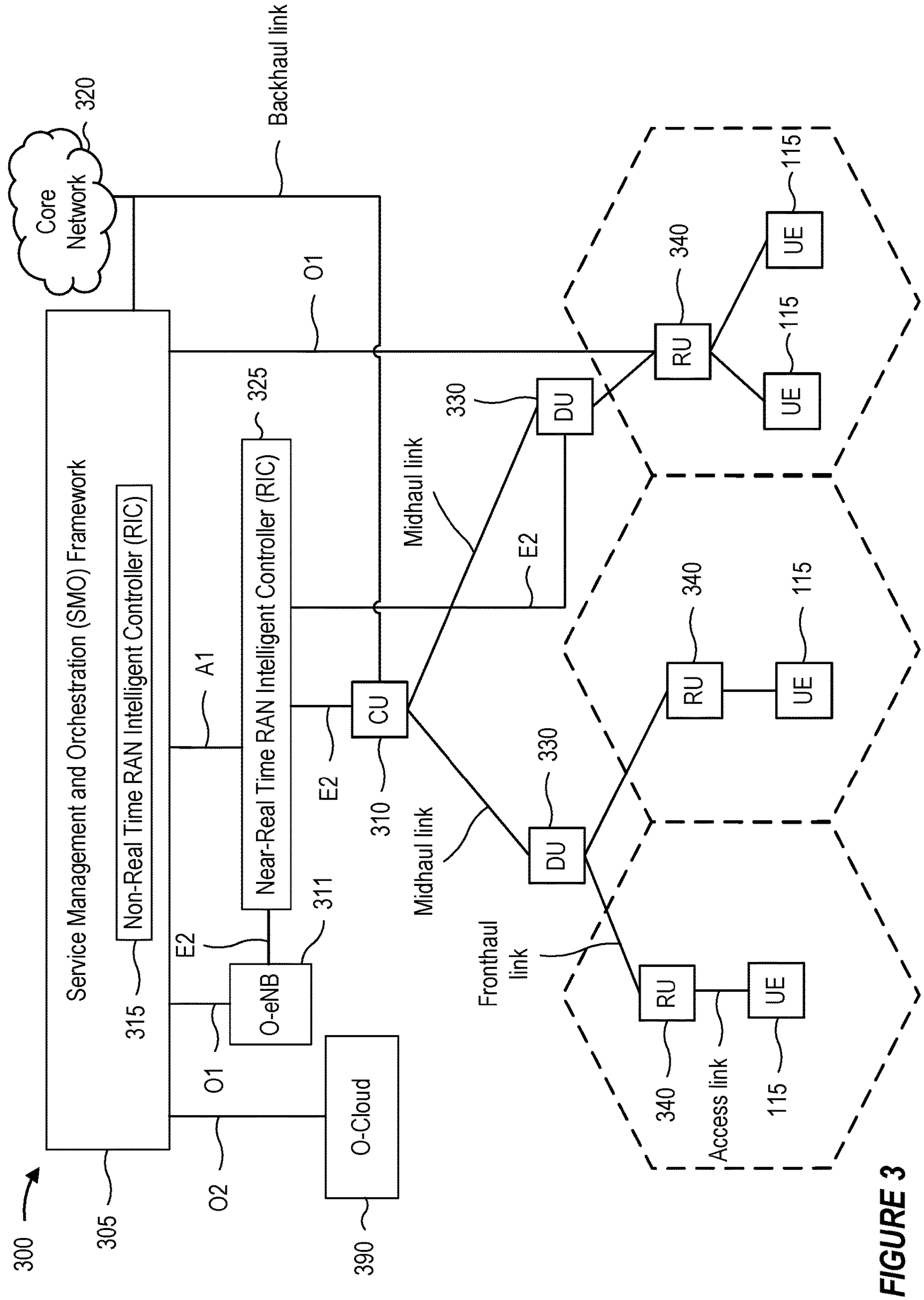
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 4:
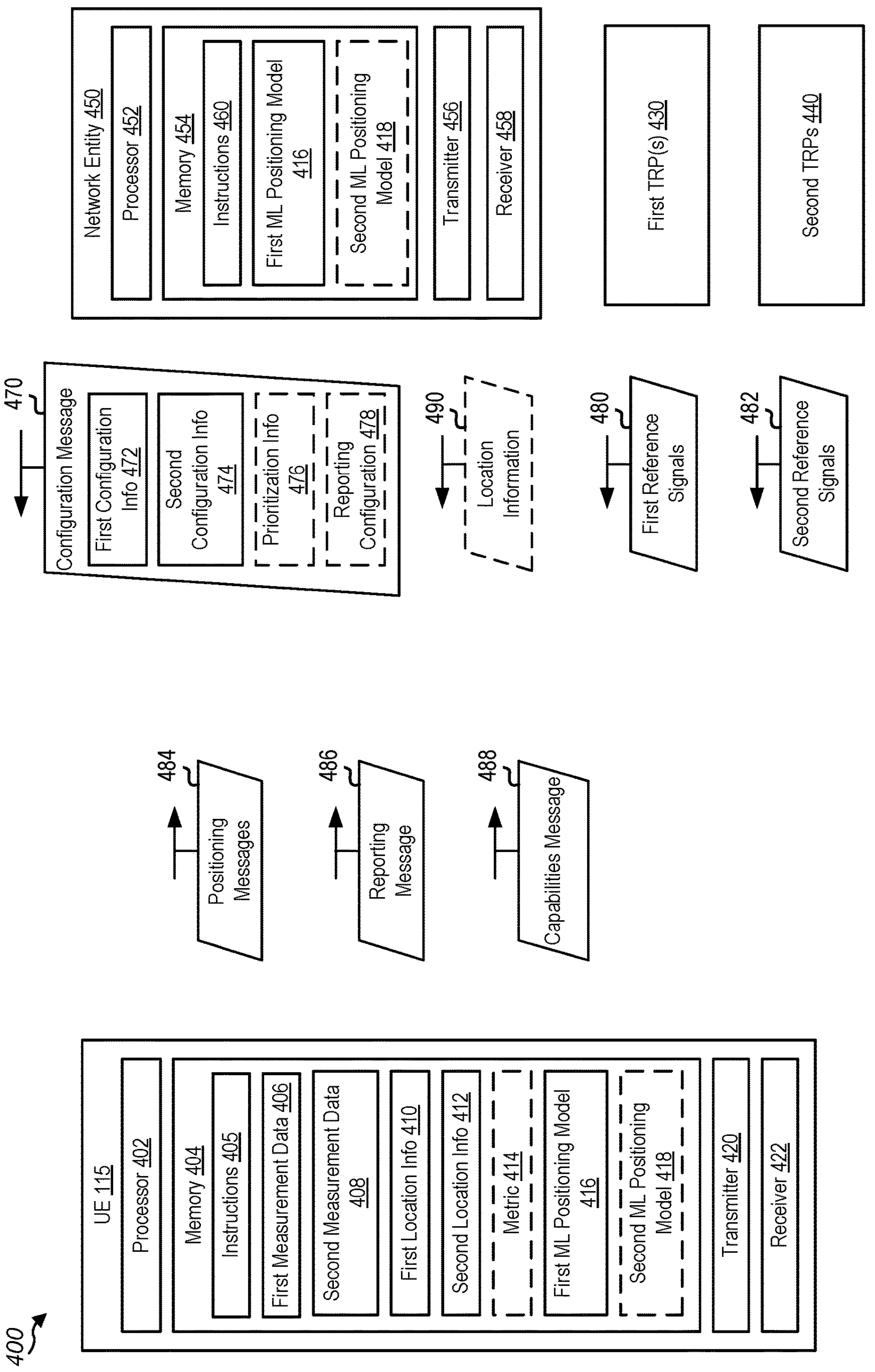
FIG. 4 is a block diagram illustrating an example wireless communication system that supports machine learning (ML) positioning model monitoring and life cycle management according to one or more aspects.

FIG. 4 is a block diagram of an example wireless communications system 300 that supports ML positioning model monitoring and life cycle management according to one or more aspects. In some examples, wireless communications system 400 may implement aspects of wireless network 100. Wireless communications system 400 includes UE 115, one or more first transmit/receive points (TRPs) (hereinafter referred to collectively as "first transmit/receive points 430" or "first TRPs 430"), one or more second TRPs (hereinafter referred to collectively as "second transmit/receive points 440" or "second TRPs 440"), and a network entity 450. Although one UE 115, one first TRP 430, one second TRP 440, and one network entity 450 are illustrated, in some other implementations, wireless communications system 400 may generally include multiple UEs 115, multiple first TRPs 430, multiple second TRPs 440, multiple network entities 450, or a combination thereof.

UE 115 may include a device, such as a mobile device, a robot, an autonomous machine, or a vehicle. As an illustrative example, UE 115 may include a robot, an automated ground vehicle (AGV), an unmanned aerial vehicle (UAV) (e.g., a drone), a self-driving vehicle, or any other type of autonomous or semi-autonomous land craft, watercraft, aircraft, or combination thereof, that is configured to traverse between multiple locations, such as between multiple designated locations or a predefined region or between multiple non-predesignated locations. As a non-limiting example, UE 115 may include a robot that is configured to load and unload shelves in a warehouse. As another non-limiting example, UE 115 may include an AGV that is configured to carry passengers between a plurality of designated drop-off points. As yet another non-limiting example, UE 115 may include a self-driving car capable of use on one or more roads. Although some examples of UE 115 are referred to herein as vehicles, UE 115 may instead be included in or integrated within an onboard unit (OBU) of a vehicle. Alternatively, UE 115 may be a mobile device that is carried by a user or a vehicle or machine about the region (e.g., about the multiple designated locations).

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), one or more transmitters 420 (hereinafter referred to collectively as "transmitter 420"), and one or more receivers 422 (hereinafter referred to collectively as "receiver 422"). In some implementations, UE 115 may include an interface (e.g., a communication interface) that includes transmitter 420, receiver 422, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405, first measurement data 406, second measurement data 408, first location information 410, second location information 412, and in some implementations, metric 414, first ML positioning model 416, second ML positioning model 418, or a combination thereof. First measurement data 406 includes one or more measurements of reference signals, such as one or more channel impulse responses (CIRs), power delay profiles (PDPs), delay profiles (DPs), or channel frequency responses (CFRs), that can be used as input for first ML positioning model 416. Second measurement data 408 includes one or more measurements of other reference signals, such as one or more CIRs, one or more PDPs, one or more DPs, one or more CFRs, one or more positioning measurements (e.g., times, angles, line of sight, etc.). First location information 410 includes location information associated with UE 115, such as coordinates of UE 115 or intermediate positioning information that may be used to derive a location (e.g., coordinates). Second location information 412 includes location information associated with UE 115 that is generated based on different reference signals than first location information 410. Metric 414 includes one or more metrics based on a comparison between first location information 410 and second location information 412.

First ML positioning model 416 may include one or more types of ML or AI models that are configured to output an estimated location based on input positioning measurements associated with a UE. In some implementations, first ML positioning model 416 may include or be implemented as one or more types of ML or AI models or logic, such as one or more neural networks (NNs) or one or more support vector machines (SVMs). As non-limiting examples, first ML positioning model 416 may include or correspond to one or more NNs, such as multi-layer perceptron (MLP) networks, convolutional neural networks (CNNs), recurrent neural networks (RNNs), deep neural networks (DNNs), deep learning neural networks (DL networks), long short-term memory (LSTM) NNS, transformer, or other types of NNs. In other examples, first ML positioning model 416 may include or correspond to one or more SVMs or other kind of trainable and machine-executable ML or AI models or logic. Additionally or alternatively, first ML positioning model 416 may be implemented as one or more other types of ML models, such as decision trees, random forests, regression models, Bayesian networks (BNs), dynamic Bayesian networks (DBNs), naive Bayes (NB) models, Gaussian processes, hidden Markov models (HMMs), regression models, or the like. Second ML positioning model 418 may include one or more types of ML or AI models that are configured to output an estimated location based on input positioning measurements associated with a UE and that has higher complexity than first ML positioning model 416, such that outputs of second ML positioning model 418 are more accurate. In some implementations, second ML positioning model 418 may include or be implemented as one or more types of ML or AI models or logic, such as one or more NNs or one or more SVMs. As non-limiting examples, second ML positioning model 418 may include or correspond to one or more NNs, such as MLP networks, CNNs, RNNs, DNNs, DL networks, LSTM NNs, transformer, or other types of NNs. In other examples, second ML positioning model 418 may include or correspond to one or more SVMs or other kind of trainable and machine-executable ML or AI models or logic. Additionally or alternatively, second ML positioning model 418 may be implemented as one or more other types of ML models, such as decision trees, random forests, regression models, BNs, DBNs, NB models, Gaussian processes, HMMs, regression models, or the like.

Transmitter 420 is configured to transmit reference signals, control information and data to one or more other devices, and receiver 422 is configured to receive references signals, synchronization signals, control information and data from one or more other devices. For example, transmitter 420 may transmit signaling, control information and data to, and receiver 422 may receive signaling, control information and data from, network entity 450. In some implementations, transmitter 420 and receiver 422 may be integrated in one or more transceivers. Additionally or alternatively, transmitter 420 or receiver 422 may include or correspond to one or more components of UE 115 described with reference to FIG. 2.

In some implementations, UE 115 may include one or more antenna arrays. The one or more antenna arrays may be coupled to transmitter 420, receiver 422, or a communication interface. The antenna array may include multiple antenna elements configured to perform wireless communications with other devices, such as with network entity 450. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Network entity 450 may include a device or entity of a wireless network, such as a 5G network, as a non-limiting example. In some implementations, network entity 450 may include or correspond to a base station or a gNB. Alternatively, network entity 450 may include or correspond to a server or another component within a core network that is configured to host one or more functions, such as a LMF. Although network entity 450 is shown in FIG. 4 as communicating with UE 115, in some other implementations, such as implementations in which network entity 450 is a server of the core network, network entity 450 may communicate with one or more intermediate network entities (e.g., one or more base stations) that communicate with UE 115 as shown in FIG. 4. Alternatively, network entity 450 may include or correspond to a base station or gNB that implements LMF or performs the operations described herein.

Network entity 450 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), one or more transmitters 456 (hereinafter referred to collectively as "transmitter 456"), and one or more receivers 458 (hereinafter referred to collectively as "receiver 458"). In some implementations, network entity 450 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242. Memory 454 includes or is configured to store instructions 460 and, in some implementations, first ML positioning model 416 and, optionally, second ML positioning model 418. First ML positioning model 416 and second ML positioning model 418 may be implemented at either UE 115 or network entity 450, and thus are illustrated in FIG. 4 as being included in both for ease of description. However, in at least some implementations, first ML positioning model 416 and second ML positioning model 418 are located at only one of the devices (and not both). Second ML positioning model 418 is optional and in some other (e.g., non-illustrated) implementations is not included in wireless communications system 400.

Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115. In some implementations, transmitter 456 and receiver 458 may be integrated in one or more transceivers. Additionally or alternatively, transmitter 456 or receiver 458 may include or correspond to one or more components of base station 105 described with reference to FIG. 2.

In some implementations, network entity 450 may include one or more antenna arrays. The antenna array may include multiple antenna elements configured to perform wireless communications with other devices, such as with UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of network entity 450. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 400 implements a 5G NR network. For example, wireless communications system 400 may include multiple 5G-capable UEs 115 and multiple 5G-capable network entities 450, such as UEs and network entities configured to operate in accordance with a 5G NR network protocol such as that defined by the 3GPP. In some other implementations, wireless communications system 400 implements a 6G network.

First TRPs 430 and second TRPs 440 may include or correspond to one or more wireless communication devices that are capable of transmitting reference signals to UEs, such as UE 115. In some examples, first TRPs 430 and second TRPs 440 may each include one or more reference nodes distributed throughout the region traversed by UE 115, such as a warehouse, a store, a storage facility, a manufacturing plant, or the like. Additionally or alternatively, first TRPs 430 and second TRPs 440 may include antennas or antenna arrays of base stations, such as network entity 450, access points, network nodes, RSUs, other UEs, other network entities, or a combination thereof.

During operation of wireless communications system 400, network entity 450 may configure UE 115 with a first set of wireless communication resources to perform positioning measurements, and in some implementations ML-based positioning estimations, and with a second set of wireless communication resources having a higher resolution to perform monitoring operations for the ML-based positioning. Such configuration may be performed by network entity 450, particularly by a location management function (LMF) hosted by network entity 450. For example, network entity 450 may transmit, and UE 115 may receive, a configuration message 470 that is associated with a first set of one or more reference signals (referred to collectively hereinafter as "first reference signals 480") and a second set of one or more reference signals (referred to collectively hereinafter as "second reference signals 482"). First reference signals 480 may be transmitted by first TRPs 430 and second reference signals 482 may be transmitted by second TRPs 440, such as based on configuration information from network entity 450, as further described herein. Second reference signals 482 may be associated with wireless resources having a higher resolution than wireless resources associated with first reference signals 480 in order to provide more accurate positioning for monitoring purposes. For example, second reference signals 482 may be transmitted via a larger bandwidth or using additional anchors (e.g., more TRPs) as compared to first reference signals 480.

First reference signals 480 and second reference signals 482 may include the same type of reference signals or different reference signals. For example, first reference signals 480 may include one or more positioning reference signals (PRSs) or one or more sensing reference signals (SRSs). As another example, second reference signals 482 may include one or more PRSs, one or more SRSs, one or more synchronization signal blocks (SSBs), one or more channel state information reference signals (CSI-RSs), or other types of reference signals. In some implementations, first reference signals 480 and second reference signals 482 are at least partially distinct (e.g., as different reference signals or by allocation to different wireless communication resources), such that second reference signals 482 may provide a more accurate "ground truth" positioning determination than first reference signals 480. For example, second reference signals 482 may be communicated via a larger bandwidth than first reference signals 480. As another example, second reference signals 482 may be communicated according to a different periodicity than first reference signals 480. In yet another example, second TRPs 440 may include one or more different TRPs than first TRPs 430. Additionally or alternatively, second TRPs 440 may include more TRPs than first TRPs 430. As another example, second reference signals 482 may at least partially overlapping with first reference signals 480 in time, frequency, or both. Additionally or alternatively, second reference signals 482 may be transmitted at a higher transmit (TX) power than first reference signals 480. As yet another example, second reference signals 482 may be associated with a different physical frequency layer (PFL) mapping than first reference signals 480. The above-mentioned examples are not exhaustive, and other examples of differences between first reference signals 480 and second reference signals 482 are possible, or combinations thereof.

To configure UE 115 to monitor for first reference signals 480 and second reference signals 482, network entity 450 transmits configuration message 470 to UE 115. Configuration message 470 may include first configuration information 472 associated with first reference signals 480, second configuration information 474 associated with second reference signals 482, and in some implementations, measurement prioritization information 476, reporting configuration information 478, or a combination thereof. First configuration information 472 may indicate a first set of time and frequency resources allocated to first reference signals 480 (e.g., reference signals for positioning), and second configuration information 474 may indicate a second set of time and frequency resources allocated to second reference signals 482 (e.g., reference signals for monitoring). Examples of wireless communication resources allocated to reference signals for positioning and monitoring are described further herein with reference to FIG. 6.

Measurement prioritization information 476 may include or indicate information that enables UE 115 to determine a priority with which second reference signals 482 are to be monitored for performing monitoring operations. For example, measurement prioritization information 476 may indicate that UE 115 is monitor for and perform measurements of second reference signals 482 according to one of various priority settings, such as an always measure priority setting, a UE autonomous decision setting, a network-configured condition setting, or a network request setting, as non-limiting examples. The always measure priority setting corresponds to UE 115 always monitoring for and measuring second reference signals 482 (e.g., according to the wireless communication resources configured for second reference signals 482). The UE autonomous decision setting corresponds to UE 115 autonomously determining or deciding when to monitor for and measure second reference signals 482. The network-configured condition setting corresponds to UE 115 monitoring for and measuring second reference signals 482 based on a condition that is configured by the network, such as a UE speed satisfying a threshold, UE 115 changing to a different serving cell, a signal to interference noise ratio (SINR) or reference signal received power (RSRP) associated with first reference signals 480 falling below a threshold, or a delay spread associated with first reference signals 480 satisfying a threshold, as non-limiting examples. The network request setting corresponds to UE 115 monitoring for and measuring second reference signals 482 based on a network request (e.g., the LMF sending a signal to UE 115 to measure second reference signals 482).

Reporting configuration information 478 may include or indicate information that configures reporting of measurements from monitoring operations at UE 115 based on second reference signals 482. For example, reporting configuration information 478 may indicate a reported information type, reporting scheduling information, a reporting quantity, one or more reporting conditions, or a combination thereof. The reported information type indicates the type of information to be reported from the group of monitoring measurements (e.g., measurements based on second reference signals 482) and a monitoring metric, as further described below. For example, the reported information type may indicate that UE 115 is to report only the monitoring measurements to the LMF (e.g., network entity 450), that UE 115 is to report only the monitoring metric to the LMF, or that UE 115 is to report both the monitoring measurements and the monitoring metric to the LMF. The reporting scheduling information indicates scheduling for the reporting to be performed by UE 115, such as whether the reporting is periodic or aperiodic, and optionally wireless communication resources allocated to the reporting. The reporting quantity indicates whether reporting is to be grouped, such as whether each measuring opportunity associated with second reference signals 482 is to be reported individually or whether measurements are to be reported in bulk (e.g., aggregated and reported when a particular amount of measurements have been performed or according to scheduling from network entity 450). The one or more reporting conditions include conditions configured by the network that, when detected by UE 115, are to trigger reporting of the monitoring measurements and/or the monitoring metric. For example, the conditions may include a UE speed satisfying a threshold, UE 115 changing to a different serving cell, a SINR or RSRP associated with first reference signals 480 falling below a threshold, or a delay spread associated with first reference signals 480 satisfying a threshold, as non-limiting examples.

To enable transmission of the reference signals, network entity 450 configures first TRPs 430 and second TRPs 440. For example, network entity 450 may send configuration information associated with first reference signals 480 and configuration information associated with second reference signals 482 to first TRPs 430 and second TRPs 440, respectively. The configuration information for first TRPs 430 may configure first TRPs 430 to transmit first reference signals 480 according to a selected positioning technique. The configuration information for second TRPs 440 may configure second TRPs 440 to transmit second reference signals 482 according to one or more strategies. For example, second TRPs 440 may be configured to always transmit (e.g., whether positioning is activated or not, according to any scheduling) second reference signals 482. As another example, second TRPs 440 may be configured to transmit second reference signals 482 based on LMF request/configuration, such as in response to signaling from the LMF (e.g., network entity 450). As yet another example, second TRPs 440 may be configured to transmit second reference signals 482 based on UE request (e.g., on-demand responsive to signaling from UE 115).

After receiving configuration message 470, UE 115 may monitor for, and perform first measurements (e.g., first measuring operations), based on first reference signals 480 received from first TRPs 430 to generate first measurement data 406. The first measuring operations may be performed to measure wireless communication channels between UE 115 and first TRPs 430 in order to detect first reference signals 480 that are transmitted by first TRPs 430. For example, the first measuring operations performed by UE 115 may include monitoring for one or more PRSs, one or more SRSs, or a combination thereof, from first TRPs 430, and performing one or more measurements of detected reference signals via the wireless communication channels. For example, UE 115 may measure one or more channel impulse responses (CIRs), one or more PDPs, one or more DPs, or one or more CFRs of the wireless communication channels to detect first reference signals 480, which may be part of performing positioning operations, and first measurement data 406 may include the measured CIRs, PDPs, DPs, or CFRs. In some examples, devices within wireless communications system 400 may be configured to exchange signaling to other devices to perform positioning operations according to one or more wireless positioning techniques. Illustrative positioning techniques include time of arrival (TOA) positioning, time difference of arrival (TDOA) positioning, observed time difference of arrival (OTDOA), angle of arrival (AOA) positioning, angle of departure (AOD) positioning, line of sight (LOS) positioning, non-line of sight (NLOS) positioning, or any other positioning technique. In some implementations, the positioning techniques may be enhanced or implemented using vehicle-to-everything (V2X) services, which may include services for Vehicle-to-Vehicle (V2V), Vehicle-to-Pedestrian (V2P), Vehicle-to-Infrastructure (V2I), and Vehicle-to-Network (V2N). Some such positioning techniques may leverage V2X or other communications over Proximity-based Services (ProSe) Direction Communication (PC5) reference point as defined in 3GPP TS 23.303, and may use wireless communications under Institute of Electrical and Electronics Engineers (IEEE) 1609, Wireless Access in Vehicular Environments (WAVE), Intelligent Transport Systems (ITS), and IEEE 802.11p, on the ITS band of 5.9 GHz, or other wireless connections directly between entities. Such wireless communications may include or be referred to as sidelink communications. In some implementations, one or more communications that occur in wireless communication system 400 may be compliant with ETSI TR 103 562 V2.1.1 (2019 December).

In some implementations, first measurement data 406 includes measurements based on first reference signals 480, or features extracted therefrom, that may be used as training data or input data for ML positioning models such as first ML positioning model 416. For example, first measurement data 406 may include one or more CIRs, one or more PDPs, one or more DPs, one or more CFRs, or features such as amplitudes that are extracted from the CIRs, the PDPs, the DPs, or the CFRs. Other measurements and features are also possible, such that the measurements or features are sufficient to train a ML positioning model to predict UE location based on input measurements or features. In some implementations, there may be multiple ML positioning models (e.g., multiple different ML models, multiple different logical models, etc.), and various ML positioning models may be associated with various features for input and training. In some examples, machine learning feature names (MLFNs) for ML-based positioning may be identified by functionality identifiers (IDs). Each functionality ID may be associated with one or more model IDs that indicate various ML models that provide the respective functionality, and each model ID may be associated with one or more realization IDs that indicate various realizations (e.g., learnings) of the respective model. In some implementations, MLFNs may be shared between UE 115 and network entity 450 (depending on where first ML positioning model 416 is implemented) in a variety of ways for training and location estimating purposes. For example, MLFNs may be shared for functionality IDs, for model IDs, for logical model IDs, for a combination of functionality IDs, logical model IDs, and model IDs, for a combination of functionality IDs and logical model IDs, for a combination of functionality IDs and model IDs, or for a combination of logical model IDs and model IDs. Sharing MLFNs may enable training and use of ML-based positioning services provided by first ML positioning model 416.

After training, first ML positioning model 416 may be implemented at various devices to provide direct ML/AI positioning services or ML/AI assisted positioning services. For example, first ML positioning model 416 may be implemented in one of the following manners: at UE 115 to provide UE-based positioning with a UE-side model; at UE 115 to provide UE-assisted/LMF-based positioning with a UE-side model; or at network entity 450 (e.g., the LMF) to provide UE-assisted/LMF-based positioning with a LMF-side model. These examples are not intended to be limiting, and other configurations in which UE 115 or network entity 450 implement first ML positioning model 416 are possible within the context of the techniques described herein. First ML positioning model 416 may be provided to other devices by sending trained ML model parameters of first ML positioning model 416 to other devices, such as network entity 450 (or the LMF if the LMF is at another device), UE 115, or any other device or entity, and the receiving devices may use the ML model parameters to instantiate and host a copy of first ML positioning model 416 Regardless of where first ML positioning model 416 is implemented, first measurement data 406 may be used as input to first ML positioning model 416 (e.g., at UE 115 or at network entity 450). In some implementations, first ML positioning model 416 is configured to generate first location information 410 that indicates a predicted (e.g., estimated) UE location of UE 115 based on the input. For example, first ML positioning model 416 may be trained to receive PRS or SRS measurements (e.g., CIRs, PDPs, DPs, or CFRs) as input data and to predict a target location (e.g., a direct label) of UE 115 based on the input data. Such examples may be referred to as direct ML/AI positioning. Alternatively, first ML positioning model 416 may be configured to output predicted intermediate positioning information. For example, first ML positioning model 416 may be trained to output predicted intermediate positioning information or measurements (e.g., intermediate labels), such as arrival or departure timing, arrival or departure angles, LOS identifications, RSRP, RSRPP, or other types of intermediate positioning information. In such examples, this intermediate positioning information may be input into non-ML based or non-AI based algorithms, such as Chan's Algorithm or a Kalman filter (KF) algorithm, or the intermediate positioning information may be input to another ML positioning model that is trained to receive intermediate positioning information as input and to output a target location (e.g., a direct label) of UE 115 based on the input data. Such examples may be referred to as ML/AI assisted positioning.

After generating first measurement data 406, and optionally generating first location information 410, UE 115 may provide the measurements or information to network entity 450. For example, UE 115 may provide first measurement data 406, first location information 410, or both, as one or more positioning messages (referred to collectively hereinafter as "positioning messages 484"). Positioning messages 484 may be received by network entity 450 and used by the LMF to manage the location of UE 115 for the network. If positioning messages 484 include first measurement data 406 and not first location information 410, network entity 450 (e.g., the LMF) may generate first location information based on first measurement data 406, in the same manner as described as for UE 115.

In addition to monitoring for and measuring first reference signals 480, after receiving configuration message 470, UE 115 may monitor for, and perform second measurements (e.g., second measuring operations), based on second reference signals 482 received from second TRPs 440 to generate second measurement data 408. The second measuring operations may be performed to measure wireless communication channels between UE 115 and second TRPs 440 in order to detect second reference signals 482 that are transmitted by second TRPs 440. For example, the second measuring operations performed by UE 115 may include monitoring for one or more PRSs, one or more SRSs, one or more SSBs, one or more CSI-RSs, other reference signals, or a combination thereof, from second TRPs 440, and performing one or more measurements of detected reference signals via the wireless communication channels. For example, UE 115 may measure one or more CIRs, PDPs, DPs, CFRs, or other positioning information, such as timing, angles, LOS, etc., and second measurement data 408 may include the measurements. These measurements may be used for monitoring performance of first ML positioning model 416, and thus second reference signals 482 may be referred to as a set of monitoring reference signals and second measurement data 408 may be referred to as monitoring information that can be used to describe the performance and quality of first ML positioning model 416 output (i.e., estimated UE location or positioning information). In some implementations, UE 115 may generate second location information 412 based on second measurement data 408. For example, if second measurement data 408 includes one or more intermediate positioning measurements, UE 115 may use another positioning method (e.g., DL-TDoA, DL-AoD, LOS, or other techniques) to generate second location information 412 based on second measurement data 408. As another example, if second measurement data 408 includes features for input to ML positioning models, UE 115 may provide second measurement data 408 as input to second ML positioning model 118 (e.g., a higher complexity ML positioning model), as further described below, to generate second location information 412.

After generating second measurement data 408, and optionally generating second location information 412, UE 115 may send a reporting message 486 to network entity 450. Reporting message 486 may be configured and scheduled in accordance with reporting configuration information 478. Reporting message 486 may be based on second measurement data 408 or based on first measurement data 406 and second measurement data 408. For example, reporting message 486 may include second measurement data 408 or second location information 412 (e.g., an estimated location that is based on second measurement data 408). As another example, reporting message 486 may include second measurement data 408 (or second location information 412), a metric 414 that is based on a comparison between first measurement data 406 and second measurement data 408 (or between first location information 410 and second location information 412), or both. Metric 414 may include one or more metrics that are based on a comparison between measurements generated based on first reference signals 480, or location information generated therefrom, and measurements generated based on second reference signals 482, or location information generated therefrom, which may indicate performance of first ML positioning model 416. For example, metric 414 may include a difference or an average difference between measurements or estimated locations, and if the distance is less than a threshold, first ML positioning model 416 may be performing within suitable tolerances as compared to more accurate positioning techniques or models. In some implementations, the information in reporting message 486 (e.g., second measurement data 408, second location information 412, metric 414, or a combination thereof) may be used to select and perform one or more life cycle management actions with respect to first ML positioning model 416, such as switching to a different ML positioning model, deactivating first ML positioning model, or falling back to another positioning method, as further described below.

In some implementations, UE 115 may provide reference signal and reporting capabilities to network entity 450 to enable network entity 450 to configure reference signals and reporting that are supported by UE 115. For example, prior to receiving configuration message 470, UE 115 may transmit a capabilities message 488 to network entity 450. Capabilities message 488 may indicate reference signal measuring capabilities of UE 115, reporting capabilities of UE 115, or both. In some examples, UE 115 may only be able to perform certain types of positioning operations or receive certain types of reference signals, or UE 115 may only be able to provide reporting at according to particular schedules, and these capabilities or restrictions may be indicated by capabilities message 488. Network entity 450 may receive capabilities message 488 and select certain configurations based on the capabilities that are indicated by capabilities message 488. Network entity 450 may transmit configuration message 470 based on receiving capabilities message 488, such that configuration message 470 includes or indicates the selected configuration that is supported by UE 115. In some implementations, UE 115 may transmit capabilities message 488 to network entity 450 during a positioning protocol capability exchange between UE 115 and network entity 450, such as an LTE positioning protocol (LPP) capability exchange or a 5G NR positioning protocol capability exchange. For example, capabilities message 488 may be included in LPP capability exchange messaging. Alternatively, UE 115 may transmit capabilities message 488 based on LMF request (e.g., in response to a capability request from network entity 450). Additionally or alternatively, UE 115 may receive configuration message 470 from network entity 450 during a positioning protocol assistance data exchange between network entity 450 and UE 115. For example, configuration message 470 may be included in LPP assistance data of 5G NR positioning protocol assistance data sent by network entity 450. Alternatively, configuration message 470 may be a positioning broadcast message that sent by network entity 450, such as LPP broadcast message or 5G NR positioning protocol broadcast message.

In UE-side ML-based positioning implementations, UE 115 may implement first ML positioning model 416. In some such examples, UE 115 may provide first measurement data 406 as input data to first ML positioning model 416 to generate first location information 410. For example, first ML positioning model 416 may be trained to output predict UE locations based on input measurement data from first reference signals 480, or features extracted from such measurement data (e.g., CIRs, PDPs, DPs, or CFRs). Additionally, UE 115 may generate second location information 412 based on second measurement data 408. In some implementations, UE 115 uses one of various positioning techniques to determine second location information 412. For example, UE 115 may apply TDoA, AoD, LOS positioning, or any other positioning technique, to second measurement data 408 to generate second location information 412. In some other implementations, UE 115 uses an additional ML positioning model to determine second location information 412. For example, UE 115 may implement second ML positioning model 418, which is more complex and more accurate than first ML positioning model 416, but may use more energy and processing resources to implement. As such, it is beneficial to limit the amount of use of second ML positioning model 418. In such implementations, UE 115 may provide second measurement data 408 as input data to second ML positioning model 418 to generate second location information 412.

After generating second location information 412, UE 115 may generate metric 414. For example, metric 414 may be based on a comparison between first location information 410 and second location information 412, and may indicate how close an estimated UE location output by first ML positioning model 416 is to a more accurate, ground truth, estimated UE location output by second ML positioning model 418. UE 115 may include second location information 412 (or second measurement data 408), metric 414, or both, in reporting message 486 based on reporting configuration information 478. In some implementations, UE 115 may perform a life cycle management operation with respect to first ML positioning model 416 based on metric 414 The life cycle management operation may be configured to manage use of first ML positioning model 416 during a lifetime of the model, and to deactivate first ML positioning model 416 when it is determined to have reached an end of life (e.g., due to deteriorating performance). As non-limiting examples, the life cycle management operation may include using and maintaining first ML positioning model 416, switching to a different ML positioning model, deactivating first ML positioning model 416, or falling back to another positioning method. For example, if metric 414 (e.g., a difference) fails to satisfy a first threshold, UE 115 may activate or continue to use first ML positioning model 416 to provide estimated location information. However, if metric 414 is greater than the first threshold, UE 115 may temporarily rely on other positioning information, alone or in combination with first ML positioning model 416. As an example, if UE 115 implements multiple ML positioning models that are trained for various different locations or conditions, UE 115 may switch to another ML positioning model instead of first ML positioning model 416 to generate estimated location information, or the estimated location information of both models may be aggregated (e.g., via averaged or weighted averaging) to generate estimated location information. As another example, UE 115 may transition (or "fall back") to using a different positioning technique, such as TDoA, AoD, LOS, etc., to generate estimated location information, or such generated positioning information may be aggregated with the output of first ML positioning model 416 to generate estimated location information. If metric 414 is greater than a second threshold (e.g., a "last resort" threshold that is greater than the first threshold), UE 115 may determine that first ML positioning model 416 is experiencing sufficient performance degradation that it has reached an end of life, and UE 115 may deactivate first ML positioning model 416. In some other implementations, instead of determining metric 414, UE 115 may include second location information 412 (or second measurement data 408) in reporting message 486, and network entity 450 may either determine the monitoring metric (e.g., metric 414) or select the life cycle management action, and the determined metric or selected action may be sent to UE 115 for selection of an action or performance of the indicated action, respectively.

In network-side ML-based positioning implementations, network entity 450 may implement first ML positioning model 416. In some such examples, network entity 450 may receive first measurement data 406 in positioning messages 484 from UE 115, and network entity 450 may provide first measurement data 406 as input data to first ML positioning model 416 to generate location information 490. Network entity 450 may send location information 490 to UE 115 to provide estimated UE location information to UE 115 based on measurements performed by UE 115. In this manner, UE 115 may receive location information 490 that indicates a predicted location of UE 115 generated by first ML positioning model 416. Additionally, network entity 450 may receive second measurement data 408 in reporting message 486, and network entity 450 may determine monitoring location information based on second measurement data 408. In some implementations, network entity 450 uses one of various positioning techniques to determine the monitoring location information, such as TDoA, AoD, LOS, or any other positioning technique. In some other implementations, network entity 450 uses an additional ML positioning model to determine the monitoring location information. For example, network entity 450 may implement second ML positioning model 418, and network entity 450 may provide second measurement data 408 as input data to second ML positioning model 418 to generate the monitoring location information. Alternatively, UE 115 may generate second location information 412 (e.g., the monitoring location information), which may be included in reporting message 486 sent by UE 115 to network entity 450. In some implementations, network entity 450 may generate a monitoring metric (e.g., metric 414) based on a comparison between location information 490 and the monitoring location information, similar to as described above with respect to UE 115. Network entity 450 may send the monitoring metric to UE 115. Additionally or alternatively, network entity 450 may select a life cycle management action to perform with respect to first ML positioning model 416, as described above. For example, network entity 450 may activate or use first ML positioning model 416, swap out first ML positioning model 416 for another ML model, or deactivate first ML positioning model 416, as non-limiting examples, based on the monitoring metric.

As described with reference to FIG. 4, the present disclosure provides techniques for supporting ML positioning model monitoring and life cycle management. The techniques described with reference to FIG. 4 result in configuration of different reference signals for use by UE 115 or network entity 450 in performing ML-based positioning (e.g., using first ML positioning model 416) and for monitoring the results of the ML-based positioning. In some aspects, by configuring second reference signals 482 with higher resolution than first reference signals 480 for use in the performance of monitoring operations, wireless communications system 400 may enable and provide improved communications, including ML-based positioning communications having improved accuracy without substantially increasing communication overhead in the wireless network. For example, location information (e.g., first location information 410) that is generated based on second reference signals 482, which has higher accuracy due to the higher resolution of second reference signals 482 compared to first reference signals 480, may be used to monitor the output of first ML positioning model 416 to determine if first ML positioning model 416 is performing within a target tolerance. If the accuracy of first ML positioning model 416 is not within the target tolerance, such as due to UE 115 moving to an environment for which first ML positioning model 416 has not been sufficiently trained, positioning for UE 115 may be switched to a different ML positioning model or positioning technique that is not as sensitive to changes in the environment. In this manner, accurate positioning can be performed using first ML positioning model 416 in some situations in which the outputs are within a target tolerance, and first ML positioning model 416 may be supplemented with other positioning information in situations in which first ML positioning model 416 does not perform as well.

Figure 5A:
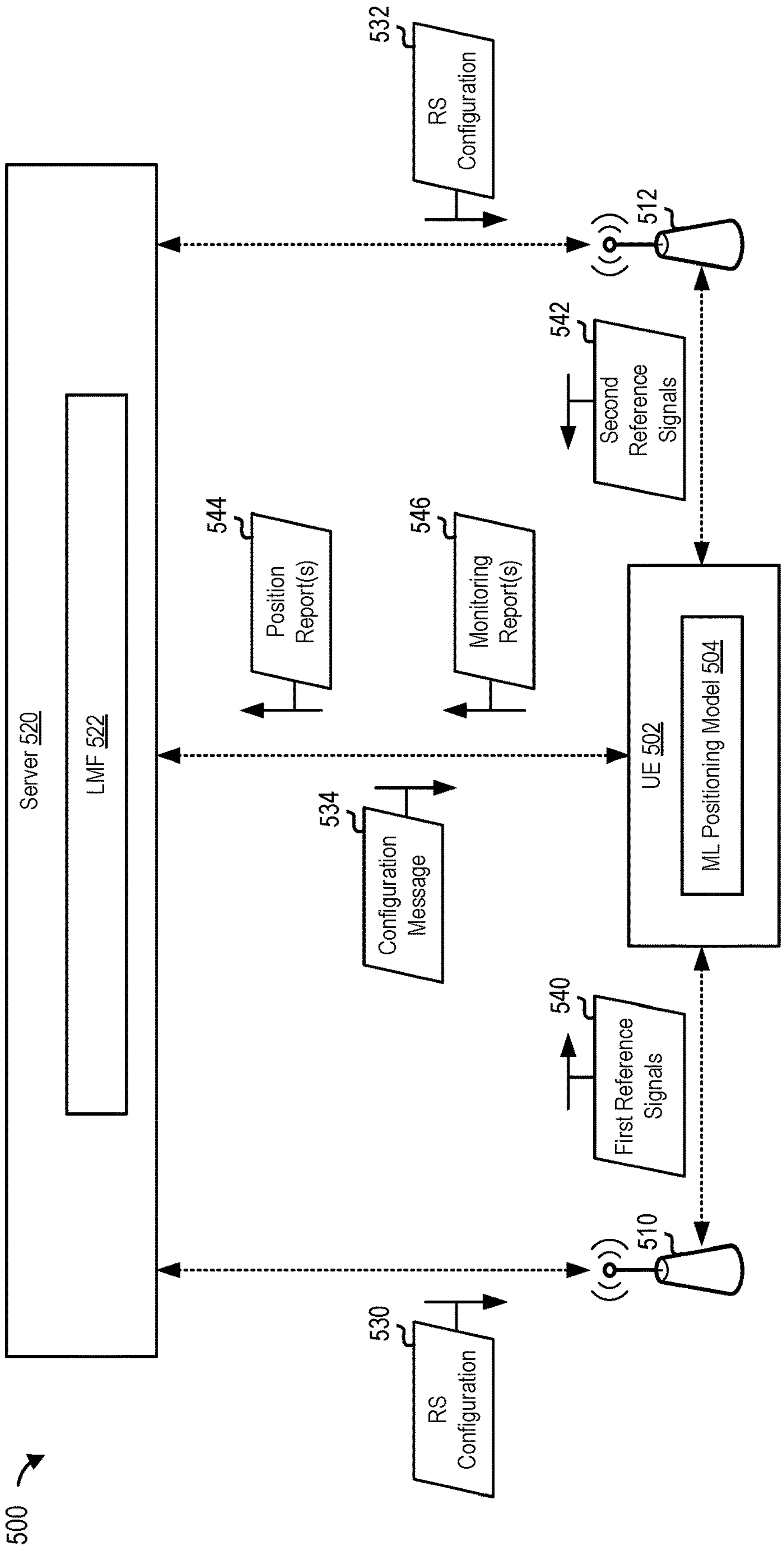
FIG. 5A illustrates an example of monitoring and life cycle management for a UE-side ML positioning model according to one or more aspects.
Figure 5B:
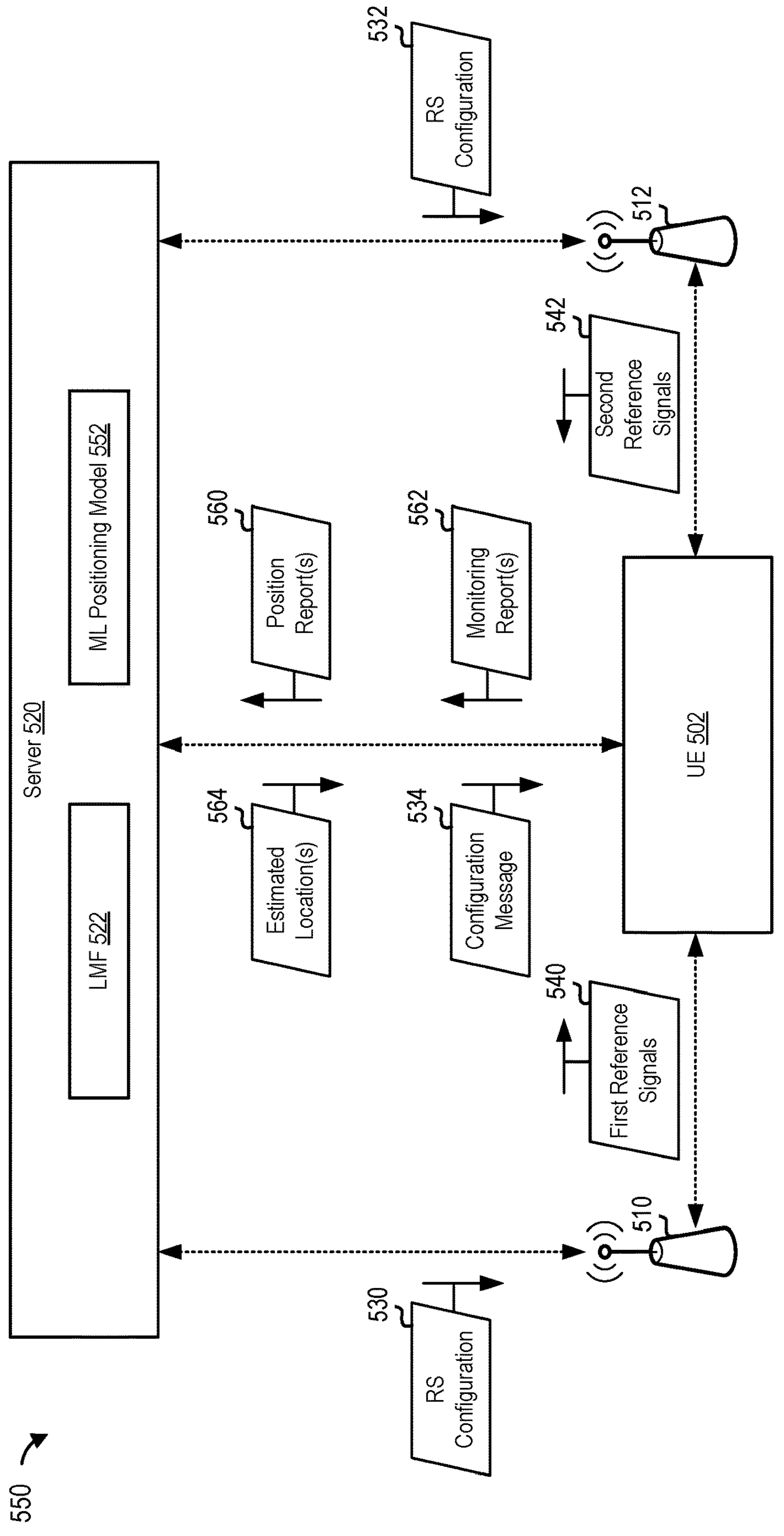
FIG. 5B illustrates an example of monitoring and life cycle management for a network-side ML positioning model according to one or more aspects.

FIGS. 5A and 5B illustrate examples of a monitoring and life cycle management for ML positioning models that are implemented at various locations in a wireless network according to one or more aspects. FIG. 5A depicts an example in which the monitoring and life cycle management is performed for a UE-side ML positioning model, and FIG. 5B depicts an example in which the monitoring and life cycle management is performed for a network-side ML positioning model.

Referring to FIG. 5A, a wireless communications system 500 includes UE 502, first TRPs 510 (e.g., a first set of one or more TRPs), second TRPs 512 (e.g., a second set of one or more TRPs), and a server 520. In some implementations, wireless communications system 500 (or components thereof) includes or corresponds to wireless communications system 400 of FIG. 4 (or components thereof). For example, UE 502 may include or correspond to UE 115, first TRPs 510 may include or correspond to first TRPs 430, second TRPs 512 may include or correspond to second TRPs 440, and server 520 may include or correspond to network entity 450. In some implementations, server 520 is a server or other network component of a core network that communicates with UE 502, first TRPs 510, and second TRPs 512. Although communication links are shown in FIG. 5A between server 520 and UE 502, and between server 520 and TRPs 510, 512, such links may not be direct communication links. Instead, server 520 may communicate with one or more intermediate network entities, such as one or more base stations, that communicate directly with UE 502 or TRPs 510, 512.

In the example shown in FIG. 5A, UE 502 includes ML positioning model 504 and server 520 includes LMF 522. ML positioning model 504 may include one or more ML models, such as NNs, SVMs, or other types of ML or AI models, that are trained to output a predicted location of UE 502 based on input measurement data (e.g., CIRs, PDPs, DPs, CFRs, or features extracted therefrom) associated with reference signals measured by UE 502. In some implementations, ML positioning model 504 includes or corresponds to first ML positioning model 416 of FIG. 4. LMF 522 may be a location management function that is hosted at server 520 and is configured to perform location management for UEs and other devices within wireless communications system 500. In some examples, LMF 522 may include or correspond to LMF 131 of FIG. 1. LMF 522, or other components of server 520, may also be configured to facilitate positioning operations and ML positioning model monitoring and life cycle management operations by UE 502. For example, LMF 522 (or another component of server 520) may configure first TRPs 510 and second TRPs 512 to transmit various reference signals, and LMF 522 (or another component of server 520) may configure UE 502 to perform one or more positioning operations and one or more monitoring operations.

Server 520 may configure UE 502, first TRPs 510, and second TRPs 512 to participate in a process for performing positioning by UE 502 and for monitoring performance, and optionally performing life cycle management, of ML positioning model 504. For example, server 520 may send reference signal (RS) configuration 530 to first TRPs 510 and RS configuration 532 to second TRPs 512. RS configuration 530 may include information associated with first reference signals 540, such as PRSs or SRSs, to be transmitted by first TRPs 510 to facilitate the process, and RS configuration 532 may include information associated with second reference signals 542, such as other PRSs or SRSs, synchronization signal blocks (SSBs), channel state information reference signals (CSI-RSs), or other types of reference signals to be transmitted by second TRPs 512 to facilitate the process. Server 520 may also send configuration message 534 to UE 502. Configuration message 534 may include configuration information that indicates or is associated with first reference signals 540 and second reference signals 542, and optionally prioritization information, reporting configuration information, or both. In some implementations, configuration message 534 may include or correspond to configuration message 470 of FIG. 4.

Based on receiving configuration message 534, UE 502 may monitor for and measure first reference signals 540 that are transmitted by first TRPs 510. For example, UE 502 may measure one or more CIRs of a wireless communication channel between UE 502 and first TRPs 510 at various times that correspond to receipt of first reference signals 540, and UE 502 may use the CIRs (e.g., the measurements) as input data to ML positioning model 504 to generate first location information that indicates a predicted location of UE 502. Although CIRs are described, UE 502 may additionally, or alternatively, measure one or more PDPs, DPs, or CFRs. UE 502 may send the first location information as one or more positioning reports 544 (e.g., one or more reports at various times, based on configuration message 534) to server 520. UE 502 may also monitor for and measure second reference signals 542 that are transmitted by second TRPs 512. For example, UE 502 may measure one or more CIRs, or other measurements, of a wireless communication channel between UE 502 and second TRPs 512 at various times that correspond to receipt of second reference signals 542, and UE 502 may use these second measurements to monitor the accuracy of the location information generated by ML positioning model 504. For example, UE 502 may generate second location information based on the second measurements associated with second reference signals 542, such as by performing a wireless positioning technique (e.g., TOA positioning, TDOA positioning. OTDOA, AOA positioning, AOD positioning, LOS positioning, NLOS positioning, etc.) based on the second measurements to generate the second location information or by using the second measurements as input data to a second ML positioning model (e.g., a more complex ML positioning model) to generate the second location information. UE 502 may send this second location information, a metric that is based on a comparison between the first location information and the second location information, or both the second location information and the metric as monitoring reports 546 to server 520.

Because second reference signals 542 are allocated to more wireless resources, in the time and/or frequency domains, or are transmitted with higher power or by more TRPs, than first reference signals 540 (or communicated in other manners that improve the amount or quality of information received and measured from second reference signals 542), the second location information that is based on second reference signals 542 may be more accurate than the first location information that is based on first reference signals 540, and thus the second location information can be used to check the accuracy of ML positioning model 504. In some implementations, UE 502 may perform a life cycle management operation with respect to ML positioning model 504 based on the metric (e.g., based on the comparison between the first location information and the second location information). For example, if the metric (e.g., a difference) is greater than or equal to a threshold, UE 502 may determine that ML positioning model 504 is no longer functioning with acceptable reliability or accuracy, and thus may deactivate ML positioning model 504 or switch to generating location information based on a different ML positioning model or a different positioning technique. Alternatively, if the metric is less than a threshold, UE 502 may determine that ML positioning model 504 is still functioning at an acceptable level, and thus continue to use ML positioning model 504 to predict location information. In some implementations, UE 502 may determine the metric that is used in determining whether to perform the life cycle management operation(s). Alternatively, UE 502 may send the second location information as monitoring reports 546, and server 520 may generate the metric and send the metric to UE 502 (or an instruction for performance of a selected life cycle management operation). In this manner, wireless communication system 500 supports UE-side ML positioning using ML positioning model 504 and monitoring of the performance of ML positioning model 504 based on second reference signals 542 in order to enable performance of life cycle management operations when performance of ML positioning model 504 sufficiently degrades.

FIG. 5B depicts a wireless communication system 550 in which network-side ML positioning is supported. In the example shown in FIG. 5B, wireless communication system 550 includes UE 502, first TRPs 510, second TRPs 512, and server 520. Server 520 includes LMF 522, as described above with reference to FIG. 5A. However, unlike the example shown in FIG. 5A, in the example shown in FIG. 5B, server 520 includes ML positioning model 552. ML positioning model 552 may include one or more ML models, such as NNs, SVMs, or other types of ML or AI models, that are trained to output a predicted location of UE 502 based on input measurement data (e.g., CIRs, PDPs, DPS, CFRs, or features extracted therefrom) associated with reference signals measured by UE 502. In some implementations, ML positioning model 552 includes or corresponds to first ML positioning model 416 of FIG. 4.

In the example shown in FIG. 5, server 520 may send RS configuration 530 to first TRPs 510 and RS configuration 532 to second TRPs 512 to configure first TRPs 510 and second TRPs 512 to transmit first reference signals 540 and second reference signals 542, respectively. Server 520 may also send configuration message 534 to UE 502. Configuration message 534 may include configuration information to UE 502 to configure UE 502 to perform measuring and monitoring operations based on first reference signals 540 and second reference signals 542. For example, UE 502 may monitor for and measure first reference signals 540 to generate first measurement data, and UE 502 may monitor for and measure second reference signals 542 to generate second measurement data. The first measurement data may include or correspond to CIRs, PDPs, DPs, CFRs, or other measurements or features that can be used as input data to ML positioning model 552, and the second measurement data may include or correspond to CIRs, PDPs, DPs, CFRs, or other measurements used for wireless positioning techniques. UE 502 may send the first data as one or more positioning reports 560 (e.g., one or more reports at various times, based on configuration message 534) to server 520, and UE 502 may send the second measurement data (or second location information generated therefrom) as one or more monitoring reports 562 to server 520.

Server 520 may receive position reports 560 and monitoring reports 562 as part of a process to provide location information to UE 502. For example, server 520 may provide the first measurement data included in position reports 560 as input data to ML positioning model 552 to generate first location information that indicates a predicted location of UE 502. Server 520 may send the first location information to UE 502 as estimated locations 564 (e.g., one or more estimated locations based on one or more measurements from various locations that are included in position reports 560). Server 520 may use the second measurement data included in monitoring reports 562 to monitor the accuracy of the location information generated by ML positioning model 5552. For example, server 520 may generate second location information based on the second measurement data included in monitoring reports 562, such as by performing a wireless positioning technique (e.g., TOA positioning, TDOA positioning, OTDOA, AOA positioning, AOD positioning, LOS positioning, NLOS positioning, etc.) based on the second measurement data to generate the second location information or by using the second measurements as input data to a second ML positioning model (e.g., a more complex ML positioning model) to generate the second location information. Server 520 may generate a metric based on a comparison between the first location information and the second location information, and use the metric to determine whether to perform a life cycle management operation on ML positioning model 552, similar to as described above with reference to FIG. 5A. In some implementations, server 520 may also send the metric to UE 502. In this manner, wireless communication system 550 supports network-side ML positioning using ML positioning model 552 and monitoring of the performance of ML positioning model 552 based on second reference signals 542 in order to enable performance of life cycle management operations when performance of ML positioning model 552 sufficiently degrades.

Figure 6:
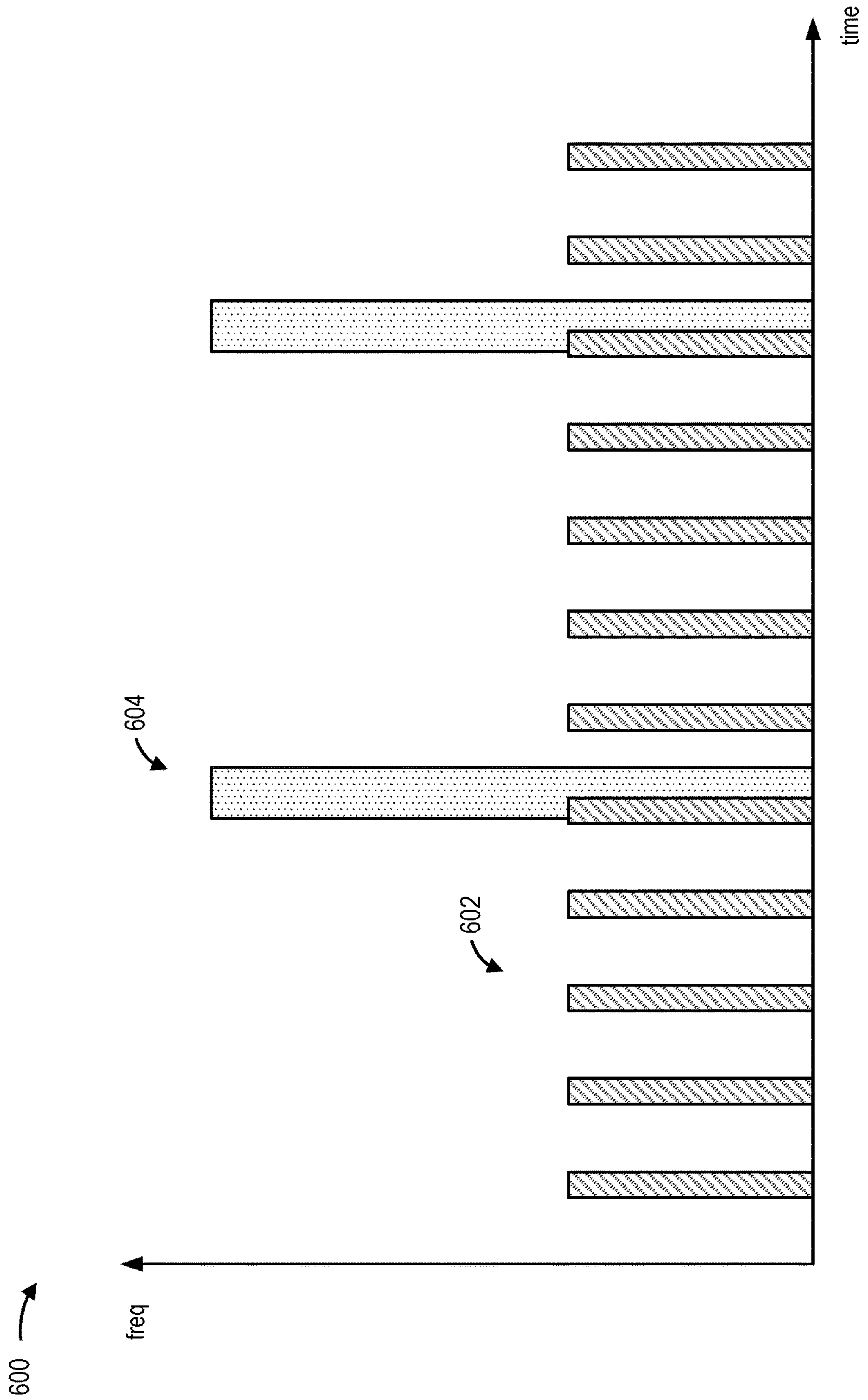
FIG. 6 is an example of wireless communication resources allocated to positioning and monitoring reference signaling according to one or more aspects.

Referring to FIG. 6, an example of wireless communication resources that are allocated to positioning and monitoring reference signaling according to one or more aspects are shown and described as wireless communication resources 600. Wireless communication resources 600 may include a combination of resources in the time domain (e.g., time resources) and resources in the frequency domain (e.g., frequency resources). In order to enable positioning operations by a UE, wireless communication resources may include positioning resources 602. For example, positioning resources 602 may include time and frequency resources that are allocated to communication of a first set of reference signals, such as one or more PRSs or SRSs, by a first set of TRPs. In some implementations, positioning resources 602 may include or correspond to wireless communication resources (e.g., measurement occasions) associated with first reference signals 480 of FIG. 4. Wireless communication resource 600 also include monitoring resources 604. For example, monitoring resources 604 may include time and frequency resources (e.g., measurement occasions) that are allocated to communication of a second set of reference signals, such as one or more PRSs, one or more SRSs, one or more SSBs, one or more CSI-RSs, or other reference signals, by a second set of TRPs. In some implementations, monitoring resources 604 may include or correspond to wireless communication resources associated with second reference signals 482 of FIG. 4.

As can be seen in the example shown in FIG. 6, more resources may be allocated to monitoring resources 604 than to positioning resources 602. For example, monitoring resources 604 may have a larger bandwidth than positioning resources 602 to enable communication of reference signals having higher resolution. Due to the higher resolution, location or positioning determinations performed based on reference signals associated with monitoring resources 604 may have higher accuracy than location or positioning determinations performed based on reference signals associated with positioning resources 602. As such, these more accurate positions or locations may be used to monitor the accuracy and performance of an ML positioning model that uses measurements based on reference signals associated with positioning resources 602 as an input. Such monitoring may include performance of a life cycle management operations, such as switching to a different ML positioning model, deactivating the ML positioning model, or switching to a different positioning technique. As can also be seen in FIG. 6, monitoring resources 604 may have a different periodicity than positioning resources 602, monitoring resources 604 may be at least partially overlapping in time, frequency, or both, with positioning resources 602, or other distinctions (e.g., TX power, number of TRPs that transmit the respective reference signals, PFL mapping, etc.) may exist between monitoring resources 604 and positioning resources 602.

Figure 7:
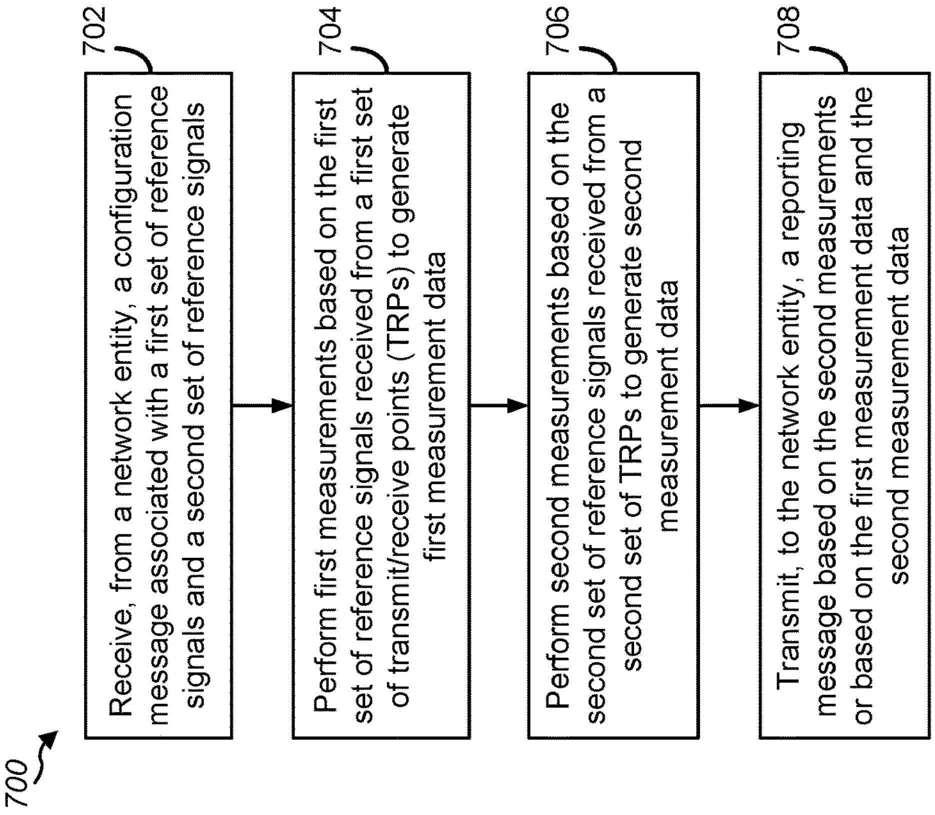
FIG. 7 is a flow diagram illustrating an example process that supports ML positioning model monitoring and life cycle management according to one or more aspects.

FIG. 7 is a flow diagram illustrating an example process 700 that supports ML positioning model monitoring and life cycle management according to one or more aspects. Operations of process 700 may be performed by a UE, such as UE 115 described above with reference to FIGS. 1-4, UE 502 described above with reference to FIGS. 5A and 5B, or a UE described with reference to FIG. 8. For example, example operations (also referred to as "blocks") of process 700 may enable UE 115 to support ML positioning model monitoring and life cycle management.

In block 702, the UE receives, from a network entity, a configuration message associated with a first set of reference signals and a second set of reference signals. For example, the configuration message may include or correspond to configuration message 470 of FIG. 4. In block 704, the UE performs first measurements based on the first set of reference signals received from a first set of TRPs to generate first measurement data. For example, the first set of reference signals may include or correspond to first reference signals 480 of FIG. 4, and the first measurement data may include or correspond to first measurement data 406 of FIG. 4.

In block 706, the UE performs second measurements based on the second set of reference signals received from a second set of TRPs to generate second measurement data. For example, the second set of reference signals may include or correspond to second reference signals 482 of FIG. 4, and the second measurement data may include or correspond to second measurement data 408 of FIG. 4. In some implementations, the first set of reference signals and the second reference signals are at least partially distinct, such as the second set of reference signals being associated with a larger bandwidth than the first set of reference signals, the second set of reference signals being associated with a different periodicity than the first set of reference signals, the second set of TRPs including one or more different TRPs than the first set of TRPs, the second set of TRPs including more TRPs than the first set of TRPs, the second set of reference signals at least partially overlapping with the first set of reference signals in time, frequency, or both, the second set of reference signals being transmitted at a higher TX power than the first set of reference signals, the second set of reference signals being associated with a different PFL mapping than the first set of reference signals, or a combination thereof. In block 708, the UE transmits, to the network entity, a reporting message based on the second measurements or based on the first measurement data and the second measurement data. For example, the reporting message may include or correspond to reporting message 486 of FIG. 4.

In some implementations, process 700 also includes providing the first measurement data as input data to a ML positioning model to generate first location information and generating second location information based on the second measurement data. The ML positioning model is configured to predict the first location information based on the first measurement data. For example, the ML positioning model may include or correspond to first ML positioning model 416 at UE 115 of FIG. 4, the first location information may include or correspond to first location information 410 of FIG. 4, and the second location information may include or correspond to second location information 412 of FIG. 4. In some such implementations, the reporting message includes the second location information. Additionally or alternatively, the reporting message may include a metric that is based on a comparison between the first location information and the second location information. For example, the metric may include or correspond to metric 414 of FIG. 4. In some implementations, the ML positioning model is trained based on features extracted from reference signal measurements (e.g., CIRs, PDPs, DPs, CFRs), and generating the second location information includes applying a positioning technique to the second measurement data. Additionally or alternatively, process 700 may also include receiving, from the network entity, an instruction message based on the reporting message. The instruction message indicates a life cycle management action. In this example, process 700 further includes performing the life cycle management action on the ML positioning model.

In some implementations, process 700 further includes, prior to receiving the configuration message, transmitting, to the network entity, a capabilities message that indicates reference signal measuring capabilities, reporting capabilities, or both. For example, the capabilities message may include or correspond to capabilities message 488 of FIG. 4.

In some implementations, the configuration message includes first configuration information associated with the first set of reference signals, second configuration information associated with the second set of reference signals, measurement prioritization information, reporting configuration information, or a combination thereof. For example, the first configuration information may include or correspond to first configuration information 472 of FIG. 4, the second configuration information may include or correspond to second configuration information 474 of FIG. 4, the measurement prioritization information may include or correspond to measurement prioritization information 476 of FIG. 4, and the reporting configuration information may include or correspond to reporting configuration information 478 of FIG. 4. In some such implementations, the measurement prioritization information indicates that the UE is to perform the second measurements according to one of: an always measure priority setting; a UE autonomous decision setting; a network-configured condition setting; or a network request setting. Additionally or alternatively, the reporting configuration information may indicate a reported information type, reporting scheduling information, a reporting quantity, one or more reporting conditions, or a combination thereof.

In some implementations, process 700 also includes transmitting, to the network entity, one or more positioning messages that include the first measurement data to enable training of a ML positioning model at the network entity. For example, the one or more positioning messages may include or correspond to positioning messages 484 of FIG. 4, and the ML positioning model may include or correspond to first ML positioning model 416 at network entity 450 of FIG. 4. In this implementation, the reporting message includes the second measurement data. In some such implementations, process 700 may further include receiving, from the network entity, location information based on transmission of the one or more positioning messages. The location information indicates a predicted location of the UE generated by the ML positioning model. For example, the location information may include or correspond to location information 490.

In some implementations, process 700 further includes transmitting, to the network entity, one or more positioning messages that include the first measurement data to enable training of a ML positioning model at the network entity. For example, the one or more positioning messages may include or correspond to positioning message 484 of FIG. 4, and the ML positioning model may include or correspond to first ML positioning model 416 at network entity 450 of FIG. 4. In these implementations, process 700 also includes generating estimated location information based on the second measurement data. The reporting message includes the estimated location information. For example, the estimated location information may include or correspond to second location information 412 of FIG. 4.

Figure 8:
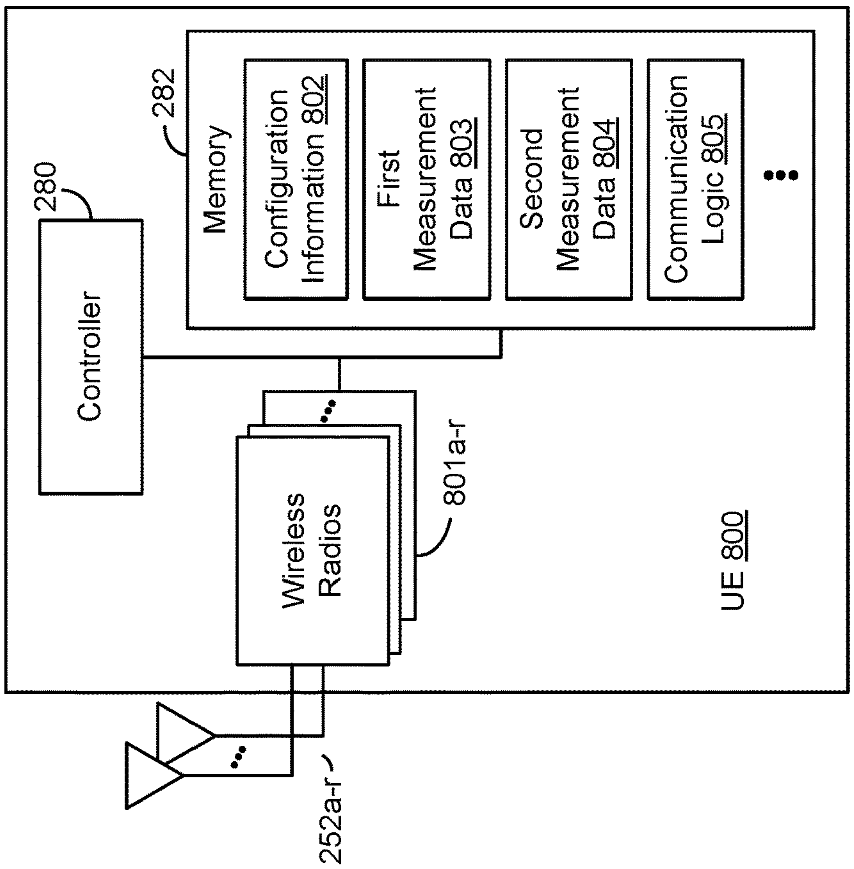
FIG. 8 is a block diagram of an example UE that supports ML positioning model monitoring and life cycle management according to one or more aspects.

FIG. 8 is a block diagram of an example UE 800 that supports ML positioning model monitoring and life cycle management according to one or more aspects. UE 800 may be configured to perform operations, including the blocks of a process described with reference to FIG. 7. In some implementations, UE 800 includes the structure, hardware, and components shown and described with reference to UE 115 of FIGS. 1-4 or UE 502 of FIGS. 5A-5B. For example, UE 800 includes controller 280, which operates to execute logic or computer instructions stored in memory 282, as well as controlling the components of UE 800 that provide the features and functionality of UE 800. UE 800, under control of controller 280, transmits and receives signals via wireless radios 801*a-r* and antennas 252*a-r*. Wireless radios 801*a-r* include various components and hardware, as illustrated in FIG. 2 for UE 115, including modulator and demodulators 254*a-r*, MIMO detector 256, receive processor 258, transmit processor 264, and TX MIMO processor 266.

As shown, memory 282 may include configuration information 802, first measurement data 803, second measurement data 804, and communication logic 805. Configuration information 802 may include or correspond to configuration message 470 of FIG. 4. First measurement data 803 may include or correspond to first measurement data 406 of FIG. 4. Second measurement data 804 may include or correspond to second measurement data 408 of FIG. 4. Communication logic 805 may be configured to enable communication between UE 800 and one or more other devices. UE 800 may receive signals from or transmit signals to one or more network entities, such as base station 105 of FIGS. 1-3, network entity 450 of FIG. 4, or server 520 of FIGS. 5A-5B.

Figure 9:
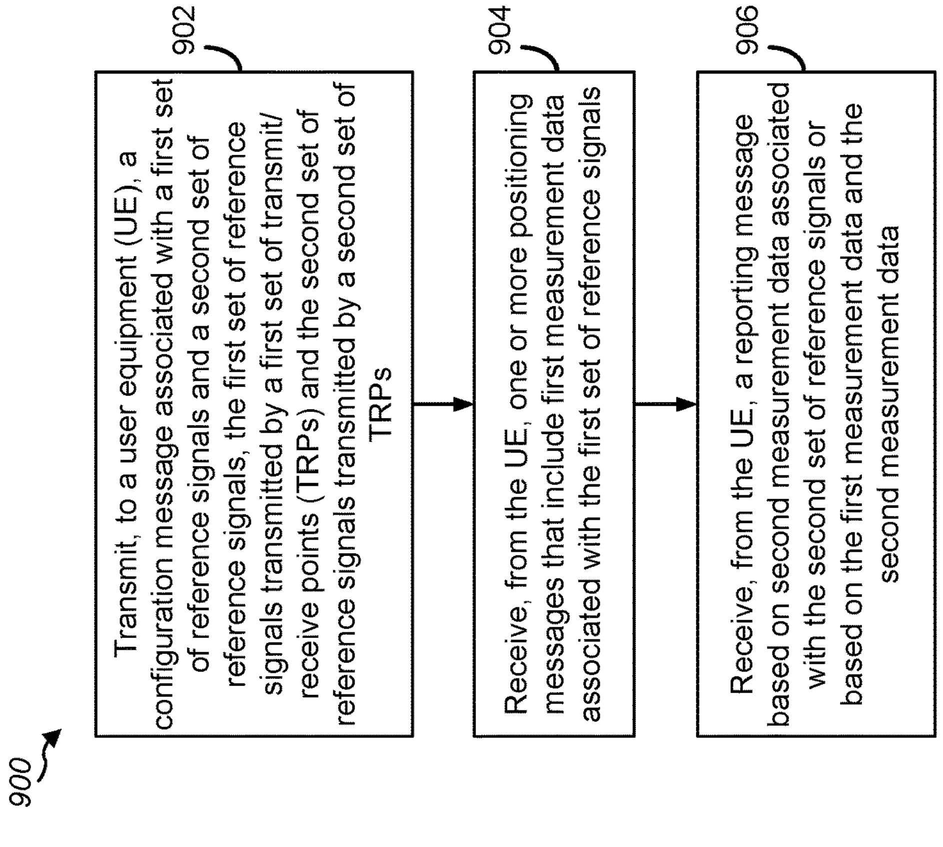
FIG. 9 is a flow diagram illustrating an example process that supports ML positioning model monitoring and life cycle management according to one or more aspects.

FIG. 9 is a flow diagram illustrating an example process 900 that supports ML positioning model monitoring and life cycle management according to one or more aspects. Operations of process 900 may be performed by a network entity, such as base station 105 described above with reference to FIGS. 1-3, network entity 450 of FIG. 4, server 520 of FIGS. 5A and 5B, or a network entity described with reference to FIG. 10. For example, example operations (also referred to as "blocks") of process 900 may enable network entity 450 to support ML positioning model monitoring and life cycle management.

In block 902, the network entity transmits, to a UE, a configuration message associated with a first set of reference signals and a second set of reference signals. For example, the configuration message may include or correspond to configuration message 470 of FIG. 4. The first set of reference signals are transmitted by a first set of TRPs and the second set of reference signals are transmitted by a second set of TRPs. For example, the first set of TRPs may include or correspond to first TRPs 430 of FIG. 4, and the second set of TRPs may include or correspond to second TRPs 440 of FIG. 4. In some implementations, the first set of reference signals and the second reference signals are at least partially distinct, such as the second set of reference signals being associated with a larger bandwidth than the first set of reference signals, the second set of reference signals being associated with a different periodicity than the first set of reference signals, the second set of TRPs including one or more different TRPs than the first set of TRPs, the second set of TRPs including more TRPs than the first set of TRPs, the second set of reference signals at least partially overlapping with the first set of reference signals in time, frequency, or both, the second set of reference signals being transmitted at a higher TX power than the first set of reference signals, the second set of reference signals being associated with a different PFL mapping than the first set of reference signals, or a combination thereof.

In block 904, the network entity receives, from the UE, one or more positioning messages that include first measurement data associated with the first set of reference signals. For example, the one or more positioning messages may include positioning messages 484 of FIG. 4. In block 906, the network entity receives, from the UE, a reporting message based on second measurement data associated with the second set of reference signals or based on the first measurement data and the second measurement data. For example, the reporting message may include or correspond to reporting message 486 of FIG. 4.

In some implementations, process 900 further includes providing the first measurement data as input data to a ML positioning model to generate first UE location information. The ML positioning model is configured to predict the first UE location information based on the first measurement data. For example, the ML positioning model may include or correspond to first ML positioning model 416 at network entity 450 of FIG. 4, and the first UE location information may include or correspond to location information 490 of FIG. 4. In these implementations, process 900 also includes generating second UE location information based on the second measurement data. In some such implementations, the ML positioning model is trained based on features extracted from reference signal measurements (e.g., CIRs, PDPs, DPs, CFRs), and generating the second UE location information includes applying a positioning technique to the second measurement data. Additionally or alternatively, generating the second UE location information may include providing the second measurement data as input data to a second ML positioning model to generate the second UE location information. The second ML positioning model has greater complexity that the ML positioning model. For example, the second ML positioning model may include or correspond to second ML positioning model 418 at network entity 450 of FIG. 4. Additionally or alternatively, process 900 may further include transmitting, to the UE, the first UE location information based on receiving the one or more positioning messages. For example, network entity 450 of FIG. 4 may transmit location information 490 to UE 115 based on receiving positioning messages 484. Additionally or alternatively, process 900 may also include generating a metric based on a comparison between the first UE location information and the second UE location information, selecting a life cycle management action based on the metric, and performing the life cycle management action on the ML positioning model. Alternatively, process 900 may further include generating a metric based on a comparison between the first UE location information and the second UE location information and transmitting, to the UE, the metric.

In some implementations, the reporting message includes the second measurement data or an estimated location that is based on the second measurement data. For example, the estimated location may include or correspond to second location information 412 of FIG. 4. Additionally or alternatively, the reporting message may include the second measurement data, a metric that is based on a comparison between the first measurement data and the second measurement data, or both. For example, the metric may include or correspond to metric 414 of FIG. 4.

In some implementations, process 900 also includes receiving, from the UE, a capabilities message that indicates reference signal measuring capabilities at the UE, reporting capabilities at the UE, or both. For example, the capabilities message may include or correspond to capabilities message 488 of FIG. 4. In these implementations, the configuration message is sent based on receiving the capabilities message.

In some implementations, the configuration message includes first configuration information associated with the first set of reference signals, second configuration information associated with the second set of reference signals, measurement prioritization information, reporting configuration information, or a combination thereof. For example, the first configuration information may include or correspond to first configuration information 472 of FIG. 4, the second configuration information may include or correspond to second configuration information 474 of FIG. 4, the measurement prioritization information may include or correspond to measurement prioritization information 476 of FIG. 4, and the reporting configuration information may include or correspond to reporting configuration information 478 of FIG. 4. In some such implementations, the first configuration information indicates a first set of time and frequency resources allocated to the first set of reference signals, and the second configuration information indicates a second set of time and frequency resources allocated to the second set of reference signals. For example, the first configuration information may indicate a set of time and frequency resources used by first TRPs 430 of FIG. 4 to transmit first reference signals 480, and the second configuration information may indicate a set of time and frequency resources used by second TRPs 440 of FIG. 4 to transmit second reference signals 482.

Figure 10:
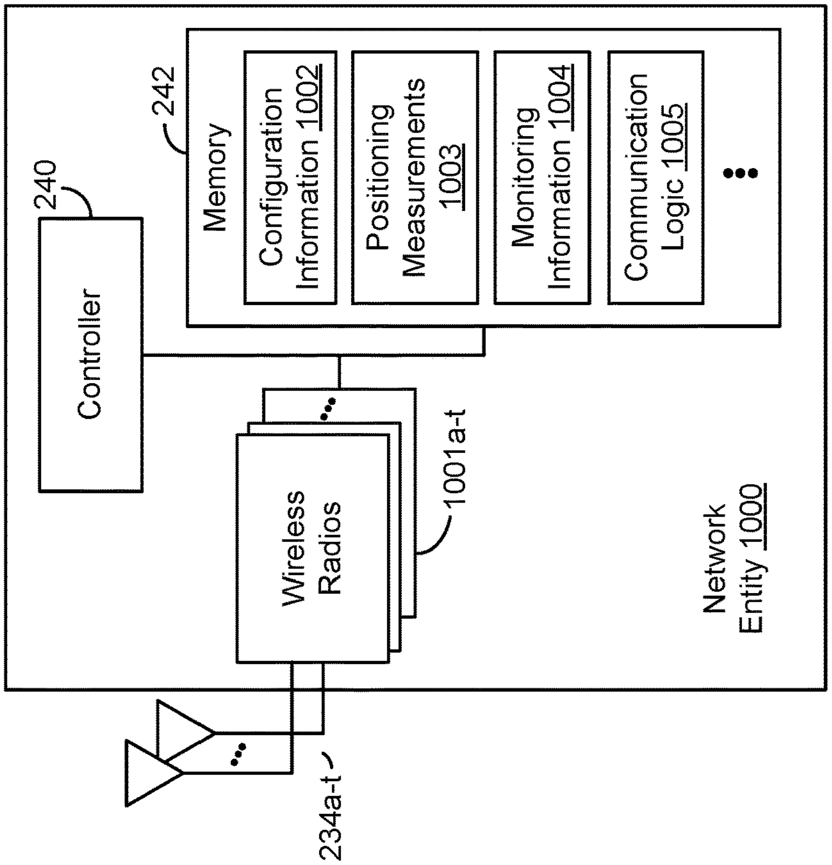
FIG. 10 is a block diagram of an example network entity that supports ML positioning model monitoring and life cycle management according to one or more aspects.

FIG. 10 is a block diagram of an example network entity 1000 that supports ML positioning model monitoring and life cycle management according to one or more aspects. Network entity 1000 may be configured to perform operations, including the blocks of a process described with reference to FIG. 9. In some implementations, network entity 1000 includes the structure, hardware, and components shown and described with reference to base station 105 of FIGS. 1-3, network entity 450, or server 520 of FIGS. 5A-5B. For example, network entity 1000 includes the structure, hardware, and components shown and described with reference to base station 105 of FIGS. 1-3, network entity 450, or server 520 of FIGS. 5A and 5B. For example, network entity 1000 may include controller 240, which operates to execute logic or computer instructions stored in memory 242, as well as controlling the components of network entity 1000 that provide the features and functionality of network entity 1000. Network entity 1000, under control of controller 240, transmits and receives signals via wireless radios 1001*a-t* and antennas 1034*a-t*. Wireless radios 1001*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include configuration information 1002, positioning measurements 1003, monitoring information 1004, and communication logic 1005. Configuration information 1002 may include or correspond to configuration message 470 of FIG. 4. Positioning measurements 1003 may include or correspond to positioning messages 484 of FIG. 4. Monitoring information 1004 may include or correspond to reporting message 486 of FIG. 4. Communication logic 1005 may be configured to enable communication between network entity 1000 and one or more other devices. Network entity 1000 may receive signals from or transmit signals to one or more UEs, such as UE 115 of FIGS. 1-4 or UE 502 of FIGS. 5A and 5B.

It is noted that one or more blocks (or operations) described with reference to FIGS. 7 and 9 may be combined with one or more blocks (or operations) described with reference to another of the figures. For example, one or more blocks (or operations) of FIG. 7 may be combined with one or more blocks (or operations) of FIG. 9. As another example, one or more blocks associated with FIGS. 7 and 9 may be combined with one or more blocks (or operations) associated with FIG. 1-4, 5A, or 5B. Additionally, or alternatively, one or more operations described above with reference to FIG. 1-4, 5A, or 5B may be combined with one or more operations described with reference to FIG. 8 or 10.

In one or more aspects, techniques for supporting ML positioning model monitoring and life cycle management may include additional aspects, such as any single aspect or any combination of aspects described below or in connection with one or more other processes or devices described elsewhere herein. In some examples, the techniques one or more aspects may be implemented in a method or process. In some other examples, the techniques of one or more aspects may be implemented in a wireless communication device, such as a UE or a component of a UE, a network entity or a component of a network entity, or a server or a component thereof. In some examples, the wireless communication device may include at least one processing unit or system (which may include an application processor, a modem or other components) and at least one memory device coupled to the processing unit. The processing unit or system may be configured to perform operations described herein with respect to the wireless communication device. In some examples, the memory device includes a non-transitory, computer-readable medium storing instructions or having program code stored thereon that, when executed by the processing unit or system, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein. In some other examples, the techniques of one or more aspects may be implemented in a network entity, such as a base station, a component of a base station, a server, a component of a server, another network entity, or a component of another network entity. In some examples, the network entity may include at least one processing unit or system (which may include an application processor, a modem or other components) and at least one memory device coupled to the processing unit. The processing unit or system may be configured to perform operations described herein with respect to the wireless communication device. In some examples, the memory device includes a non-transitory, computer-readable medium storing instructions or having program code stored thereon that, when executed by the processing unit or system, is configured to cause the network entity to perform the operations described herein. Additionally, or alternatively, the network entity may include an interface (e.g., a wireless communication interface) that includes a transmitter, a receiver, or a combination thereof. Additionally, or alternatively, the network entity may include one or more means configured to perform operations described herein.

Implementation examples are described in the following numbered clauses:

Clause 1: A method of wireless communication performed by a user equipment (UE), the method including: receiving, from a network entity, a configuration message associated with a first set of reference signals and a second set of reference signals; performing first measurements based on the first set of reference signals received from a first set of transmit/receive points (TRPs) to generate first measurement data; performing second measurements based on the second set of reference signals received from a second set of TRPs to generate second measurement data; and transmitting, to the network entity, a reporting message based on the second measurements or based on the first measurement data and the second measurement data.

Clause 2: The method of Clause 1, further including: providing the first measurement data as input data to a machine learning (ML) positioning model to generate first location information, the ML positioning model configured to predict the first location information based on the first measurement data; and generating second location information based on the second measurement data.

Clause 3: The method of Clause 2, where the reporting message includes the second location information.

Clause 4: The method of Clause 2, where the reporting message includes a metric that is based on a comparison between the first location information and the second location information.

Clause 5: The method of Clause 2, where the ML positioning model is trained based on features extracted from reference signal measurements, and where generating the second location information includes applying a positioning technique to the second measurement data.

Clause 6: The method of Clause 2, where generating the second location information includes providing the second measurement data as input data to a second ML positioning model to generate the second location information, and where the second ML positioning model has greater complexity that the ML positioning model.

Clause 7: The method of Clause 2, further including: receiving, from the network entity, an instruction message based on the reporting message, the instruction message indicating a life cycle management action; and performing the life cycle management action on the ML positioning model.

Clause 8: The method of Clause 1, where: the second set of reference signals are associated with a larger bandwidth than the first set of reference signals; the second set of reference signals are associated with a different periodicity than the first set of reference signals; the second set of TRPs include one or more different TRPs than the first set of TRPs; the second set of TRPs include more TRPs than the first set of TRPs; the second set of reference signals at least partially overlap with the first set of reference signals in time, frequency, or both; the second set of reference signals are transmitted at a higher transmit (TX) power than the first set of reference signals; the second set of reference signals are associated with a different physical frequency layer (PFL) mapping than the first set of reference signals; or a combination thereof.

Clause 9: The method of Clause 1, further including: prior to receiving the configuration message, transmitting, to the network entity, a capabilities message that indicates reference signal measuring capabilities, reporting capabilities, or both.

Clause 10: The method of Clause 1, where the configuration message includes first configuration information associated with the first set of reference signals, second configuration information associated with the second set of reference signals, measurement prioritization information, reporting configuration information, or a combination thereof.

Clause 11: The method of Clause 10, where the measurement prioritization information indicates that the UE is to perform the second measurements according to one of: an always measure priority setting; a UE autonomous decision setting; a network-configured condition setting; or a network request setting.

Clause 12: The method of Clause 10, where the reporting configuration information indicates a reported information type, reporting scheduling information, a reporting quantity, one or more reporting conditions, or a combination thereof.

Clause 13: A user equipment (UE) configured for wireless communication, the UE including: a memory storing processor-readable code; and at least one processor coupled to the memory, the at least one processor configured to execute the processor-readable code to cause the at least one processor to: receive, from a network entity, a configuration message associated with a first set of reference signals and a second set of reference signals; perform first measurements based on the first set of reference signals received from a first set of transmit/receive points (TRPs) to generate first measurement data; perform second measurements based on the second set of reference signals received from a second set of TRPs to generate second measurement data; and transmit, to the network entity, a reporting message based on the second measurement data or based on the first measurement data and the second measurement data.

Clause 14: The UE of Clause 13, where the at least one processor is further configured to: transmit, to the network entity, one or more positioning messages that include the first measurement data to enable training of a machine learning (ML) positioning model at the network entity, where the reporting message includes the second measurement data.

Clause 15: The UE of Clause 14, where the at least one processor is further configured to: receive, from the network entity, location information based on transmission of the one or more positioning messages, the location information indicating a predicted location of the UE generated by the ML positioning model.

Clause 16: The UE of Clause 13, where the at least one processor is further configured to: transmit, to the network entity, one or more positioning messages that include the first measurement data to enable training of a machine learning (ML) positioning model at the network entity; and generate estimated location information based on the second measurement data, where the reporting message includes the estimated location information.

Clause 17: A method of wireless communication performed by a network entity, the method including: transmitting, to a user equipment (UE), a configuration message associated with a first set of reference signals and a second set of reference signals, the first set of reference signals transmitted by a first set of transmit/receive points (TRPs) and the second set of reference signals transmitted by a second set of TRPs; receiving, from the UE, one or more positioning messages that include first measurement data associated with the first set of reference signals; and receiving, from the UE, a reporting message based on second measurement data associated with the second set of reference signals or based on the first measurement data and the second measurement data.

Clause 18: The method of Clause 17, further including: providing the first measurement data as input data to a machine learning (ML) positioning model to generate first UE location information, the ML positioning model configured to predict the first UE location information based on the first measurement data; and generating second UE location information based on the second measurement data.

Clause 19: The method of Clause 18, where the ML positioning model is trained based on features extracted from reference signal measurements, and where generating the second UE location information includes applying a positioning technique to the second measurement data.

Clause 20: The method of Clause 18, where generating the second UE location information includes providing the second measurement data as input data to a second ML positioning model to generate the second UE location information, and where the second ML positioning model has greater complexity that the ML positioning model.

Clause 21: The method of Clause 18, further including: transmitting, to the UE, the first UE location information based on receiving the one or more positioning messages.

Clause 22: The method of Clause 18, further including: generating a metric based on a comparison between the first UE location information and the second UE location information; selecting a life cycle management action based on the metric; and performing the life cycle management action on the ML positioning model.

Clause 23: The method of Clause 18, further including: generating a metric based on a comparison between the first UE location information and the second UE location information; and transmitting, to the UE, the metric.

Clause 24: The method of Clause 17, where the reporting message includes the second measurement data or an estimated location that is based on the second measurement data.

Clause 25: The method of Clause 17, where the reporting message includes the second measurement data, a metric that is based on a comparison between the first measurement data and the second measurement data, or both.

Clause 26: A network entity configured for wireless communication, the network entity including: a memory storing processor-readable code; and at least one processor coupled to the memory, the at least one processor configured to execute the processor-readable code to cause the at least one processor to: transmit, to a user equipment (UE), a configuration message associated with a first set of reference signals and a second set of reference signals, the first set of reference signals transmitted by a first set of transmit/receive points (TRPs) and the second set of reference signals transmitted by a second set of TRPs; receive, from the UE, one or more positioning messages that include first measurement data associated with the first set of reference signals; and receive, from the UE, a reporting message based on second measurement data associated with the second set of reference signals or based on the first measurement data and the second measurement data.

Clause 27: The network entity of Clause 26, where the at least one processor is further configured to: receive, from the UE, a capabilities message that indicates reference signal measuring capabilities at the UE, reporting capabilities at the UE, or both, where the configuration message is sent based on receiving the capabilities message.

Clause 28: The network entity of Clause 26, where the configuration message includes first configuration information associated with the first set of reference signals, second configuration information associated with the second set of reference signals, measurement prioritization information, reporting configuration information, or a combination thereof.

Clause 29: The network entity of Clause 28, where the first configuration information indicates a first set of time and frequency resources allocated to the first set of reference signals, and where the second configuration information indicates a second set of time and frequency resources allocated to the second set of reference signals.

Clause 30: The network entity of Clause 26, where: the second set of reference signals are associated with a larger bandwidth than the first set of reference signals; the second set of reference signals are associated with a different periodicity than the first set of reference signals; the second set of TRPs include one or more different TRPs than the first set of TRPs; the second set of TRPs include more TRPs than the first set of TRPs; the second set of reference signals at least partially overlap with the first set of reference signals in time, frequency, or both; the second set of reference signals are transmitted at a higher transmit (TX) power than the first set of reference signals; the second set of reference signals are associated with a different physical frequency layer (PFL) mapping than the first set of reference signals; or a combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:

receiving, from a network entity, a configuration message associated with a first set of reference signals and a second set of reference signals;

performing first measurements based on the first set of reference signals received from a first set of transmit/receive points (TRPs) to generate first measurement data;

performing second measurements based on the second set of reference signals received from a second set of TRPs to generate second measurement data, the first measurement data associated with positioning information for input to a machine learning (ML) positioning model and the second measurement data associated with monitoring performance information of the ML positioning model; and transmitting, to the network entity, a reporting message based on the second measurements or based on the first measurement data and the second measurement data.

2. The method of claim 1, further comprising:

providing the first measurement data as input data to the ML positioning model to generate first location information, the ML positioning model configured to predict the first location information based on the first measurement data; and generating second location information based on the second measurement data, the second location information indicative of a quality of the predicted first location information.

3. The method of claim 2, wherein the reporting message includes the second location information.

4. The method of claim 2, wherein the reporting message includes a metric that is based on a comparison between the first location information and the second location information.

5. The method of claim 2, wherein the ML positioning model is trained based on features extracted from reference signal measurements, and wherein generating the second location information comprises applying a positioning technique to the second measurement data.

6. The method of claim 2, wherein generating the second location information comprises providing the second measurement data as input data to a second ML positioning model to generate the second location information, and wherein the second ML positioning model has greater complexity that the ML positioning model.

7. The method of claim 2, further comprising:

receiving, from the network entity, an instruction message based on the reporting message, the instruction message indicating a life cycle management action; and performing the life cycle management action on the ML positioning model.

8. The method of claim 1, wherein:

the second set of reference signals are associated with a larger bandwidth than the first set of reference signals;

the second set of reference signals are associated with a different periodicity than the first set of reference signals;

the second set of TRPs include one or more different TRPs than the first set of TRPs;

the second set of TRPs include more TRPs than the first set of TRPs;

the second set of reference signals at least partially overlap with the first set of reference signals in time, frequency, or both;

the second set of reference signals are transmitted at a higher transmit (TX) power than the first set of reference signals;

the second set of reference signals are associated with a different physical frequency layer (PFL) mapping than the first set of reference signals; or a combination thereof.

9. The method of claim 1, further comprising:

prior to receiving the configuration message, transmitting, to the network entity, a capabilities message that indicates reference signal measuring capabilities, reporting capabilities, or both.

10. The method of claim 1, wherein the configuration message includes first configuration information associated with the first set of reference signals, second configuration information associated with the second set of reference signals, measurement prioritization information, reporting configuration information, or a combination thereof.

11. The method of claim 10, wherein the measurement prioritization information indicates that the UE is to perform the second measurements according to one of:

an always measure priority setting;

a UE autonomous decision setting;

a network-configured condition setting; or a network request setting.

12. The method of claim 10, wherein the reporting configuration information indicates a reported information type, reporting scheduling information, a reporting quantity, one or more reporting conditions, or a combination thereof.

13. A user equipment (UE) configured for wireless communication, the UE comprising:

a memory storing processor-readable code; and at least one processor coupled to the memory, the at least one processor configured to execute the processor-readable code to cause the at least one processor to:

receive, from a network entity, a configuration message associated with a first set of reference signals and a second set of reference signals;

perform first measurements based on the first set of reference signals received from a first set of transmit/receive points (TRPs) to generate first measurement data;

perform second measurements based on the second set of reference signals received from a second set of TRPs to generate second measurement data, the first measurement data associated with positioning information for input to a machine learning (ML) positioning model and the second measurement data associated with monitoring performance information of the ML positioning model; and transmit, to the network entity, a reporting message based on the second measurement data or based on the first measurement data and the second measurement data.

14. The UE of claim 13, wherein the at least one processor is further configured to:

transmit, to the network entity, one or more positioning messages that include the first measurement data to enable training of the ML positioning model at the network entity, wherein the reporting message includes the second measurement data.

15. The UE of claim 14, wherein the at least one processor is further configured to:

receive, from the network entity, location information based on transmission of the one or more positioning messages, the location information indicating a predicted location of the UE generated by the ML positioning model.

16. The UE of claim 15, wherein the at least one processor is further configured to:

transmit, to the network entity, one or more positioning messages that include the first measurement data to enable training of the ML positioning model at the network entity; and generate estimated location information based on the second measurement data, wherein the reporting message includes the estimated location information, the estimated location information indicative of a quality of the predicted location information.

17. A method of wireless communication performed by a network entity, the method comprising:

transmitting, to a user equipment (UE), a configuration message associated with a first set of reference signals and a second set of reference signals, the first set of reference signals transmitted by a first set of transmit/receive points (TRPs) and the second set of reference signals transmitted by a second set of TRPs;

receiving, from the UE, one or more positioning messages that include first measurement data associated with the first set of reference signals; and receiving, from the UE, a reporting message based on second measurement data associated with the second set of reference signals or based on the first measurement data and the second measurement data, the first measurement data associated with positioning information for input to a machine learning (ML) positioning model and the second measurement data associated with monitoring performance information of the ML positioning model.

18. The method of claim 17, further comprising:

providing the first measurement data as input data to the ML positioning model to generate first UE location information, the ML positioning model configured to predict the first UE location information based on the first measurement data; and generating second UE location information based on the second measurement data, the second UE location information indicative of a quality of the predicted first UE location information.

19. The method of claim 18, wherein the ML positioning model is trained based on features extracted from reference signal measurements, and wherein generating the second UE location information comprises applying a positioning technique to the second measurement data.

20. The method of claim 18, wherein generating the second UE location information comprises providing the second measurement data as input data to a second ML positioning model to generate the second UE location information, and wherein the second ML positioning model has greater complexity that the ML positioning model.

21. The method of claim 18, further comprising:

transmitting, to the UE, the first UE location information based on receiving the one or more positioning messages.

22. The method of claim 18, further comprising:

generating a metric based on a comparison between the first UE location information and the second UE location information;

selecting a life cycle management action based on the metric; and performing the life cycle management action on the ML positioning model.

23. The method of claim 18, further comprising:

generating a metric based on a comparison between the first UE location information and the second UE location information; and transmitting, to the UE, the metric.

24. The method of claim 17, wherein the reporting message includes the second measurement data or an estimated location that is based on the second measurement data.

25. The method of claim 17, wherein the reporting message includes the second measurement data, a metric that is based on a comparison between the first measurement data and the second measurement data, or both.

26. A network entity configured for wireless communication, the network entity comprising:

a memory storing processor-readable code; and at least one processor coupled to the memory, the at least one processor configured to execute the processor-readable code to cause the at least one processor to:

transmit, to a user equipment (UE), a configuration message associated with a first set of reference signals and a second set of reference signals, the first set of reference signals transmitted by a first set of transmit/receive points (TRPs) and the second set of reference signals transmitted by a second set of TRPs;

receive, from the UE, one or more positioning messages that include first measurement data associated with the first set of reference signals; and receive, from the UE, a reporting message based on second measurement data associated with the second set of reference signals or based on the first measurement data and the second measurement data, the first measurement data associated with positioning information for input to a machine learning (ML) positioning model and the second measurement data associated with monitoring performance information of the ML positioning model.

27. The network entity of claim 26, wherein the at least one processor is further configured to:

receive, from the UE, a capabilities message that indicates reference signal measuring capabilities at the UE, reporting capabilities at the UE, or both, wherein the configuration message is sent based on receiving the capabilities message.

28. The network entity of claim 26, wherein the configuration message includes first configuration information associated with the first set of reference signals, second configuration information associated with the second set of reference signals, measurement prioritization information, reporting configuration information, or a combination thereof.

29. The network entity of claim 28, wherein the first configuration information indicates a first set of time and frequency resources allocated to the first set of reference signals, and wherein the second configuration information indicates a second set of time and frequency resources allocated to the second set of reference signals.

30. The network entity of claim 26, wherein:

the second set of reference signals are associated with a larger bandwidth than the first set of reference signals;

the second set of reference signals are associated with a different periodicity than the first set of reference signals;

the second set of TRPs include one or more different TRPs than the first set of TRPs;

the second set of TRPs include more TRPs than the first set of TRPs;

the second set of reference signals at least partially overlap with the first set of reference signals in time, frequency, or both;

the second set of reference signals are transmitted at a higher transmit (TX) power than the first set of reference signals;

the second set of reference signals are associated with a different physical frequency layer (PFL) mapping than the first set of reference signals; or a combination thereof.

* * * * *